US008580059B2

(12) United States Patent
Takada

(10) Patent No.: US 8,580,059 B2
(45) Date of Patent: *Nov. 12, 2013

(54) METHOD AND DEVICE FOR SEPARATING AND REMOVING RIGID CORE FOR BUILDING TIRE

(75) Inventor: Noboru Takada, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 26 days.

This patent is subject to a terminal disclaimer.

(21) Appl. No.: 13/239,003

(22) Filed: Sep. 21, 2011

(65) Prior Publication Data

US 2012/0240375 A1    Sep. 27, 2012

Related U.S. Application Data

(62) Division of application No. 12/161,641, filed as application No. PCT/JP2007/055924 on Mar. 22, 2007, now Pat. No. 8,034,204.

(30) Foreign Application Priority Data

Mar. 22, 2006  (JP) .................................. 2006-079368

(51) Int. Cl.
    *B29D 30/10*    (2006.01)
(52) U.S. Cl.
    USPC ........................................ 156/110.1; 156/414
(58) Field of Classification Search
    USPC ......... 156/133, 407, 414, 417, 110.1; 425/31, 425/35, 48, 54, 55, 57; 249/63, 64
    See application file for complete search history.

(56) References Cited

U.S. PATENT DOCUMENTS 1,366,750 A      1/1921  Smith et al.
3,994,650 A  *  11/1976  Nishimura et al. ........... 425/577

(Continued)

FOREIGN PATENT DOCUMENTS

JP      A 11-58385       3/1999
JP      2001-150447   *  5/2001

(Continued)

OTHER PUBLICATIONS

Machine-generated English language translation of JP 2002-307440 (Original document dated Oct. 2002).*

(Continued)

*Primary Examiner* — Martin K. Rogers
(74) *Attorney, Agent, or Firm* — Greer, Burns & Crain, Ltd.

(57) ABSTRACT

A method for separating and removing a rigid core when building a tire. When the rigid core body is to be separated and removed from the inside of the tire, the method includes removing a core holding mechanism and upper and lower support plates; transferring the tire to a support table; raising a second core separation/removal mechanism; horizontally pulling a first type of segment groups until separated from the inner surface of the tire; lowering the first type of the segment groups below the support table; lowering a first core separation/removal mechanism to the center of the height position of the rigid core body; horizontally pulling the second type of the segment groups until they are separated from the inner surface of the tire; transferring a second type of the segment groups with a second core separation/removal mechanism, and conveying the tire to the subsequent process.

2 Claims, 28 Drawing Sheets

(56) References Cited

U.S. PATENT DOCUMENTS

| | | | |
|---|---|---|---|
| 4,059,375 A | 11/1977 | Koch et al. | |
| 4,279,856 A * | 7/1981 | Vente et al. | 264/313 |
| 4,608,219 A | 8/1986 | Singh et al. | |
| 6,113,833 A | 9/2000 | Ogawa | |
| 7,621,308 B2 | 11/2009 | Lundell et al. | |
| 8,034,204 B2 * | 10/2011 | Takada | 156/110.1 |
| 2003/0135972 A1 | 7/2003 | Scarzello | |

FOREIGN PATENT DOCUMENTS

| | | | |
|---|---|---|---|
| JP | 2001-150447 | | 6/2001 |
| JP | 2002-307440 | * | 10/2002 |
| JP | A 2002-307440 | | 10/2002 |
| JP | A 2003-523851 | | 8/2003 |
| JP | A 2003-340824 | | 12/2003 |
| JP | A 2005-319657 | | 11/2005 |
| JP | A 2005-319658 | | 11/2005 |

OTHER PUBLICATIONS

Machine-generated English language translation of JP 2001-150447 (Original document dated Oct. 2001).*

* cited by examiner

METHOD AND DEVICE FOR SEPARATING AND REMOVING RIGID CORE FOR BUILDING TIRE

This is a Divisional of application Ser. No. 12/161,641, filed Jul. 21, 2008, which is a U.S. National Phase under U.S.C. §371, of International Application No. PCT/JP2007/055924, filed Mar. 22, 2007.

TECHNICAL FIELD

The present invention relates to a method and a device for separating and removing a rigid core for building a tire. More specifically, the present invention relates to a method and a device for separating and removing a rigid core for building a tire, which are capable of efficiently separating and automatically removing a tire-building rigid core from the inside of the tire that has been built using the rigid core, the tire either having been vulcanized or having not been vulcanized.

BACKGROUND ART

An invention of "a method and a device for manufacturing a pneumatic tire" using a rigid core for determining the form of the inner surface of a pneumatic tire at the time of building the tire has been heretofore proposed (see, for example, Patent Document 1). Moreover, a method for removing a plurality of segments constituting a rigid core for manufacturing a tire, a method for removing and assembling the segments, and a device for implementing these methods are proposed. Here, the rigid core is used for determining the inner surface of the tire until a green tire is built or throughout the building and vulcanization of the green tire (see, for example, Patent Document 2).

In the meanwhile, the rigid core used in the former device for manufacturing a pneumatic tire has a substantially cylindrical and divided structure in which two types of a sector-shaped segment and a substantially trapezoidal mount-shaped segment, these segments being made of a metal material, are alternately disposed in the circumferential direction of the tire. At the time of manufacturing a pneumatic tire, the multiple sector-shaped segments and mount-shaped segments are alternately disposed in the circumferential direction of the tire to form a cylindrical shape, thereby constituting a rigid core. After the tire is vulcanized and thus molded, the multiple sector-shaped segments are pulled in a radial direction, and separated from the mount-shaped segments.

Nevertheless, in order to separate and assemble the rigid core thus divided in plurality, a lot of work and time are needed. Moreover, a sophisticated skill is required for the separation and assemblage of the rigid core serving as an inner mold without causing any damage. Thus, there has been a problem of a significantly poor operating efficiency.

In the latter method and device for removing the segments constituting the core for manufacturing a tire, when the multiple segments having been divided into the different types are removed from the inside of the tire, the different types of the segments are removed one by one. Accordingly, a lot of work and time are needed to remove all the segments from the inside of the tire. Moreover, at the time of the removal, the segment is pulled out while the upper and lower edge portions of the segment are being clamped by a clamp mechanism. As a result, there has been a problem that the method and device have an adverse influence on the quality of a tire thus built and on the accuracy of building a tire.

[Patent Document 1] Japanese patent application Kokai publication No. 2003-523851

[Patent Document 2] Japanese patent application Kokai publication No. 2002-307440

DISCLOSURE OF THE INVENTION

The present invention has focused on these conventional problems. An object of the present invention is to provide a method and a device capable of separating and removing, from the inside of the tire that has been vulcanized or that has not been vulcanized, segment groups constituting a tire-building rigid core divided in plurality, in which method and device each type of the segment groups is removed automatically and simultaneously.

In order to achieve the object, a gist of the present invention is a method for separating and removing a rigid core for building a tire, in which method at least two types of segment groups constituting a rigid core body divided in plurality in a circumferential direction of the tire are separated and removed sequentially for each segment type from the inside of the tire having been vulcanized or having not been vulcanized when the tire is built. In the method, when the rigid core body is to be separated and removed from the inside of the tire, a core holding mechanism and upper and lower support plates are removed from the rigid core body disposed in the tire. Subsequently, the tire is transferred to a predetermined position on a support table, and positioned and fixed. Thereafter, a first core separation/removal mechanism having been on standby below the center of the tire on the support table is raised to hold the center of the inner wall surface of a first type of the segment groups among the at least two types of segment groups. Moreover, the first type of the segment groups is horizontally pulled to the center side of the tire until the first type of the segment groups is separated from the inner surface of the tire. Furthermore, the first type of the segment groups thus separated is lowered to a standby position below the center of the support table, and left on standby. Then, a second core separation/removal mechanism having been on standby at another standby position is raised to the center of the height position of the rigid core body so as to hold the center of the inner wall surface of a second type of the segment groups. Moreover, the second type of the segment groups is horizontally pulled to the center side of the tire until the second type of the segment groups is separated from the inner surface of the tire. Afterwards, the second type of the segment groups is transferred to the standby position by the second core separation/removal mechanism. The tire from which the rigid core body is separated, is conveyed to the subsequent process by a convey device.

Moreover, another gist of the present invention is a method for separating and removing a rigid core for building a tire, in which method at least two types of segment groups constituting a rigid core body divided in plurality in a circumferential direction of the tire are separated and removed sequentially for each segment type from the inside of the tire having been vulcanized or having not been vulcanized when the tire is built. In the method, when the rigid core body is to be separated and removed from the inside of the tire, a core holding mechanism and upper and lower support plates are removed from the rigid core body disposed in the tire. Subsequently, the tire is transferred to a predetermined position on a support table, and positioned and fixed. Thereafter, a second core separation/removal mechanism positioned on the lower side among a pair of upper and lower core separation/removal mechanisms having been on standby below the center of the tire on the support table is raised to the center of the height position of the rigid core body by elevating means thereby to hold the center of the inner wall surface of a first type of the segment groups among the at least two types of segment groups by the second core separation/removal mechanism. Moreover, the first type of the segment groups is horizontally pulled to the center side of the tire until the first type of the segment groups is separated from the inner surface of the tire. Furthermore, the first type of the segment groups thus separated is lowered to a standby position below the center of the support table, and left on standby. Then, a first core separation/removal mechanism positioned higher is raised to the center of the height position of the rigid core body thereby to hold the center of the inner wall surface of the second type of the segment groups by the first core separation/removal mechanism. Moreover, the second type of the segment groups is horizontally pulled to the center side of the tire until the second type of the segment groups is separated from the inner surface of the tire. Afterwards, the second type of the segment groups is transferred to the standby position by the second core separation/removal mechanism. The tire from which the rigid core body is separated, is conveyed to the subsequent process by a convey device.

In this respect, when the first and second core separation/removal mechanisms sequentially hold the center of the inner wall surfaces of the first and second types of the segment groups, multiple attachment-detachment cylinders of the core separation/removal mechanisms are caused to extend in a radial direction. Moreover, engagement portions provided to tip end portions of rods of the attachment-detachment cylinders engage with engagement portions formed at the center of the inner wall surfaces of the segment groups. Then, the segment groups are sequentially and horizontally pulled to the center side by contracting the attachment-detachment cylinders.

In addition, another gist of the present invention is a device for separating and removing a rigid core for building a tire, in which device at least two types of segment groups constituting a rigid core body divided in plurality in a circumferential direction of the tire are separated and removed sequentially for each segment type from the inside of the tire having been vulcanized or having not been vulcanized when the tire is built. The device includes a slide table, positioning means, an elevating device, and a pair of core separation/removal mechanisms. The slide table and the positioning means are provided on a support table of the separation/removal device. The slide table is slidable to convey the tire whose inner surface is held by the rigid core body and a core holding mechanism, to a central position on the support table. The elevating device is provided on the central axis of the support table, and has clamping means to elevate the rigid core body and the tire from which the core holding mechanism is removed, to a position where the rigid core body and the tire do not interfere with the core holding mechanism. The pair of the core separation/removal mechanisms is disposed below the center of the support table, is capable of elevating movement, and radially contracts and removes each type of the segment groups.

In this respect, the pair of the core separation/removal mechanisms may include a first core separation/removal mechanism and a second core separation/removal mechanism that are disposed to a vertical cylinder. The vertical cylinder is provided to a lower portion of the central axis of the support table. The first core separation/removal mechanism and the second core separation/removal mechanism are respectively provided radially with multiple clamp arms which clamp or unclamp the two types of the segment groups divided in plurality. Moreover, the first core separation/removal mechanism and the second core separation/removal mechanism may be vertically disposed to the vertical cylinder, while separating from each other at a predetermined interval.

Moreover, an elevating cylinder may be disposed below the center of the support table in a vertical direction. A horizontal table disposed with a guide rail may be disposed below the support table. The core separation/removal mechanisms may be detachably provided with a first hold plate and a second hold plate above the guide rail of the horizontal table, respectively. The first hold plate is disposed with multiple attachment-detachment cylinders which hold a first type of the segment groups, at a tip end of the elevating cylinder in a radial direction. The second hold plate is slidable, and disposed with multiple attachment-detachment cylinders which hold a second type of the segment groups. Moreover, engagement portions may be provided to tip ends of rods of the multiple attachment-detachment cylinders disposed on the hold plates that hold the respective types of the segment groups in the core separation/removal mechanisms. The engagement portions are engageable with and disengageable from engagement portions formed on the inner circumferential surfaces of the segments. Moreover, upper and lower support plates may be detachably provided to end portions of a central shaft of the core holding mechanism with supporting members, and bead rings may be detachably provided to peripheral portions of the upper and lower support plates.

With this configuration, it is possible to automatically and simultaneously separate and remove each type of the segment groups constituting a tire-building rigid core divided in plurality from the inside of the tire that has been vulcanized or that has not been vulcanized.

EFFECTS OF THE INVENTION

With the above-described configuration, the present invention is capable of exerting excellent effects as follows.
(a) Each type of the rigid core body can be separated and automatically removed from the built and vulcanized tire, and then conveyed.
(b) Since the rigid core body can be separated automatically without requiring man-power, the operating efficiency can be significantly improved. Moreover, by reversing the separation process, the separated rigid core body can also be assembled.
(c) The entire device can be manufactured relatively easily and cost-effectively, and also the configuration can be made compact.

Figure 1:
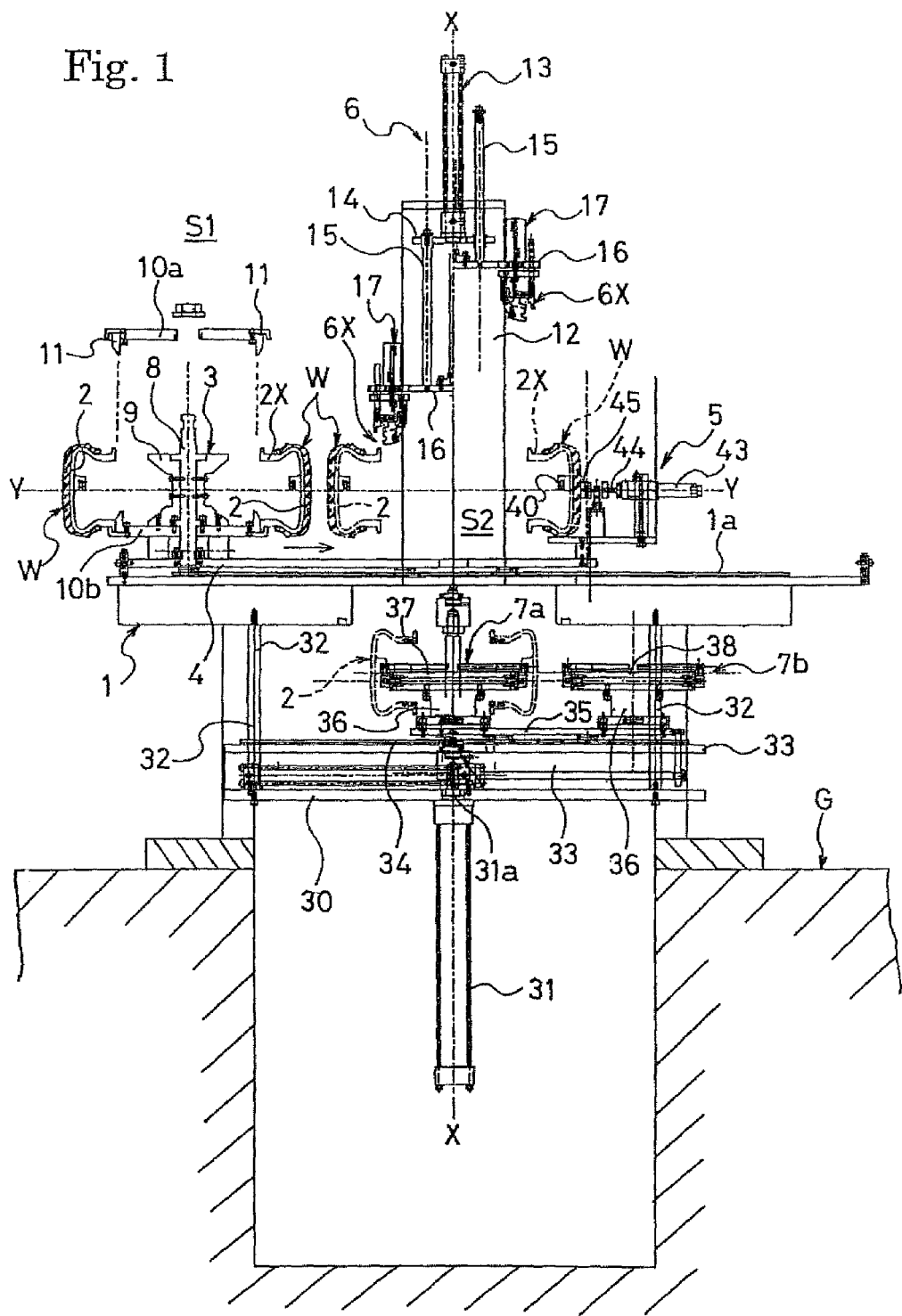
FIG. 1 is a front view of a partial cross-section of a device for separating and removing a rigid core for building a tire according to the present invention.

DESCRIPTION OF REFERENCE NUMERALS 1 support table
1a guide rail
2 rigid core body
3 core holding mechanism
2a sector-shaped segment
2b mount-shaped segment
2A, 2B segment groups
2x upper-opening-edge portion
4 slide table
5 tire positioning means
6 elevating device
6x clamping means
7a, 7b core separation/removal mechanism
8 central shaft
9 supporting member
10a, 10b support plate
11 bead ring
13 elevating cylinder
17a rod
18 connection plate
21 clamp mechanism
23 clamping hook
31 vertical cylinder
33 support stand
34 guide rail
35 slide table
37 first hold plate
38 second hold plate
39 attachment-detachment cylinder
40 engagement portion
41 engagement member

BEST MODES FOR CARRYING OUT THE INVENTION

Hereinafter, embodiments of the present invention will be described with reference to the accompanying drawings.

Figure 2:
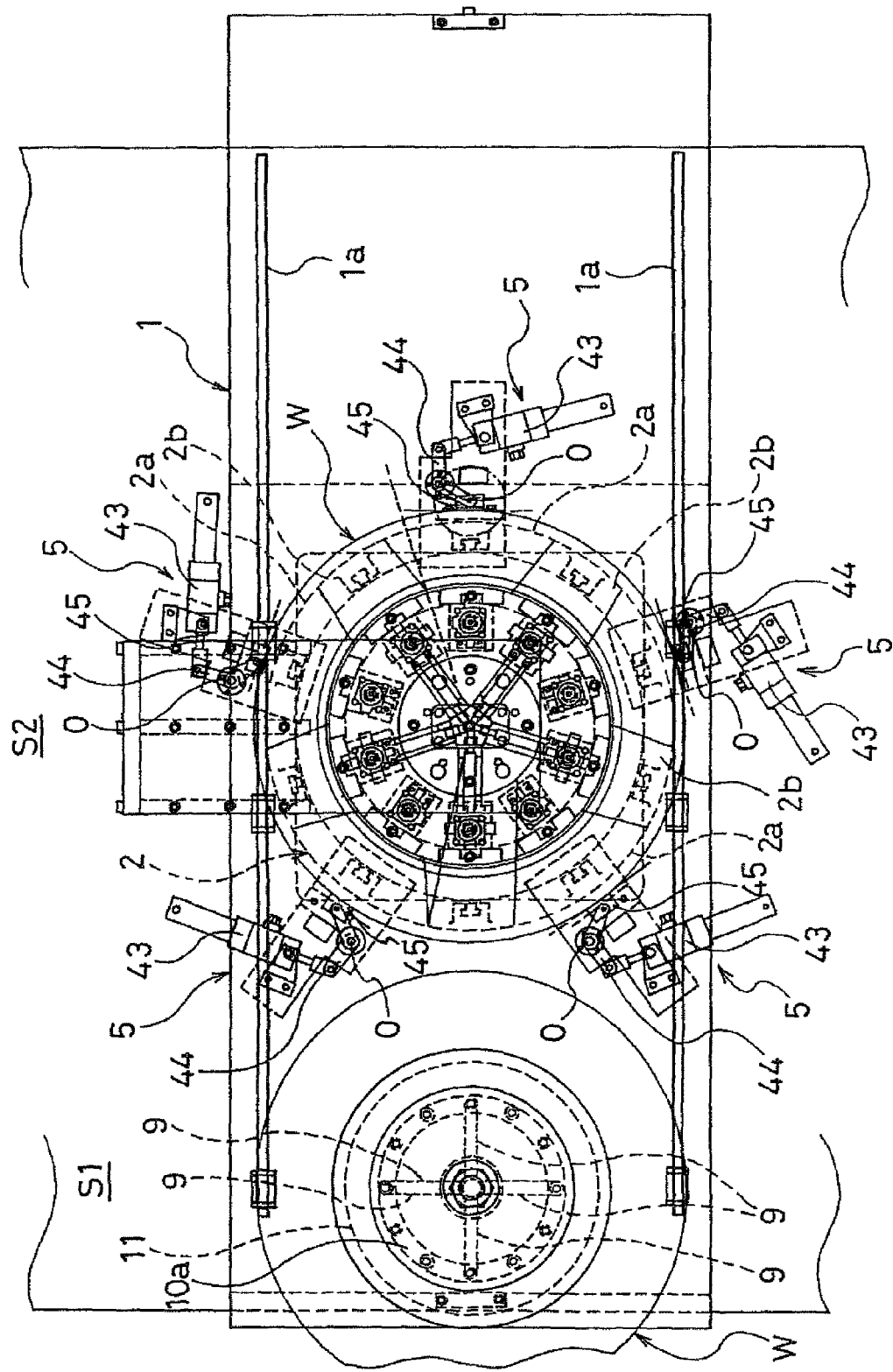
FIG. 2 is a plan view of FIG. 1.
Figure 3:
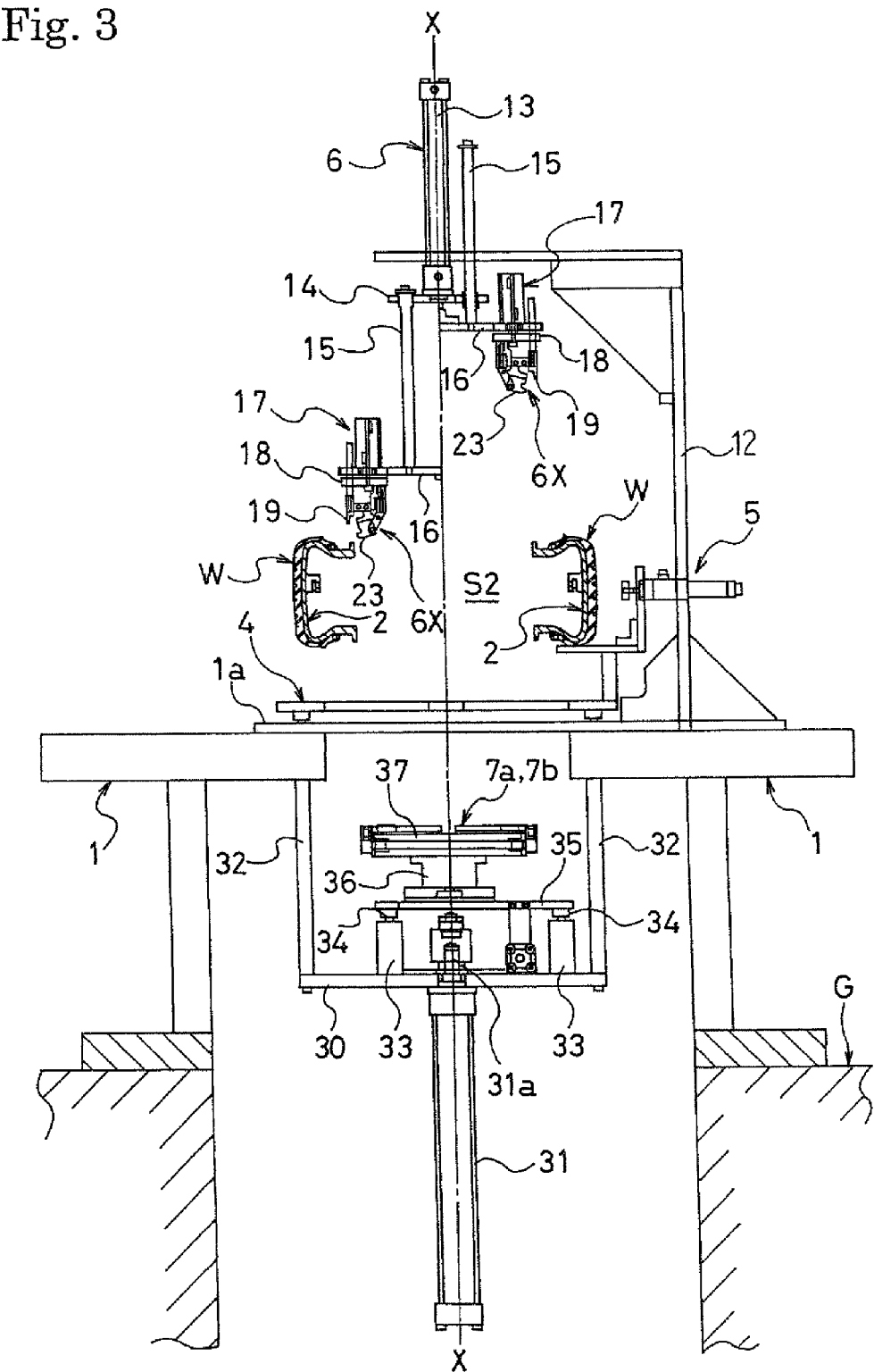
FIG. 3 is a side view of FIG. 1.

FIG. 1 shows a front view of a partial cross-section of a device for separating and removing a rigid core for building a tire according to the present invention. FIG. 2 shows a plan view of FIG. 1. FIG. 3 shows a side view of FIG. 1. In the separation/removal device, a guide rail 1a is disposed on a support table 1 that is provided on a base G. A slide table 4 is mounted along the guide rail 1a. The slide table 4 is slidable to convey a tire W to a central position X-X on the support table 1. The tire W either has been vulcanized or has not been vulcanized, and the inner surface of the tire W is being held by a rigid core body 2 and a core holding mechanism 3. Moreover, multiple tire positioning means 5 are provided (in this embodiment, the five tire positioning means 5 are provided in the circumferential direction of the tire in predetermined intervals; however, the number is not limited) around the central position X-X on the support table 1. The tire positioning means 5 hold the outer circumferential surface of the tire W to perform centering.

Figure 4:
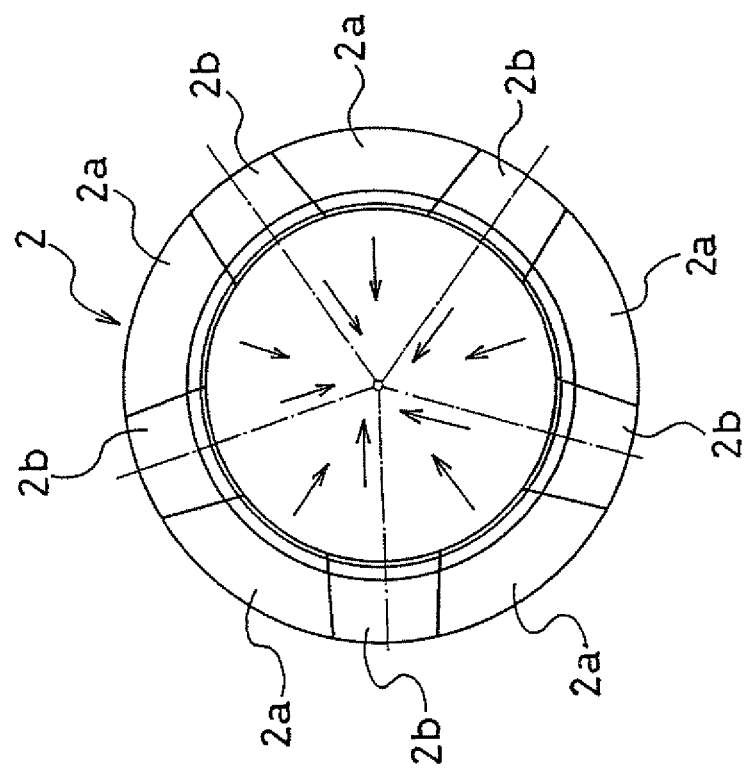
FIG. 4 is a plan view of a rigid core body composed of two types of segment groups.

An elevating device 6 is disposed on the central axis X-X of the support table 1, and is provided with clamping means 6x that elevate the rigid core body 2 and the tire W from which the core holding mechanism 3 is removed, to a position where the rigid core body 2 and the tire W do not interfere with the core holding mechanism 3. A pair of core separation/removal mechanisms 7a, 7b is disposed on a lower side of the central axis X-X of the support table 1. The core separation/removal mechanisms 7a, 7b are capable of elevating up and down and moving in a horizontal direction, and remove two types of segment groups 2A, 2B composed of sector-shaped segments 2a and substantially trapezoidal mount-shaped segments 2b, as shown in FIG. 4, from the rigid core body 2, while radially contracting one type of the segment groups at a time.

Figure 5:
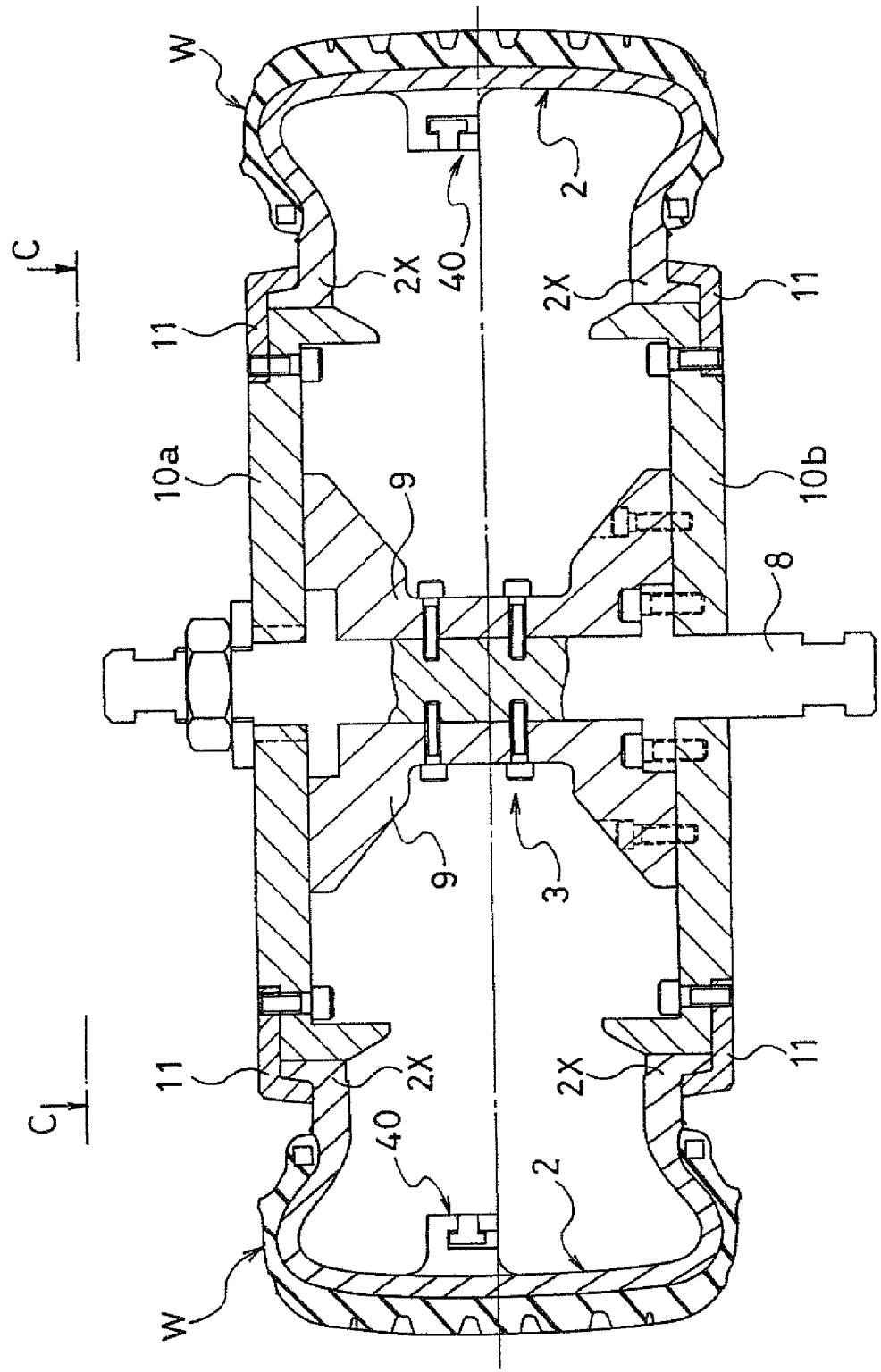
FIG. 5 is a cross-sectional view of the rigid core body and the tire held by a core holding mechanism.

The rigid core body 2 has a substantially cylindrical and divided structure (in this embodiment, the structure is divided into 10 for the five segments 2a and the five segment 2b; however, the number of division is not limited). In this structure, the two types of the sector-shaped segment 2a and the substantially trapezoidal mount-shaped segment 2b, these segments being made of a metal material such as steel and aluminium, are alternately disposed in the circumferential direction of the tire as shown in FIG. 4 and FIG. 5. At the time of manufacturing the pneumatic tire W, the multiple sector-shaped segments 2a and mount-shaped segments 2b are alternately disposed in the circumferential direction of the tire to form a cylindrical shape, and thereby the rigid core body 2 is constituted.

Figure 6:
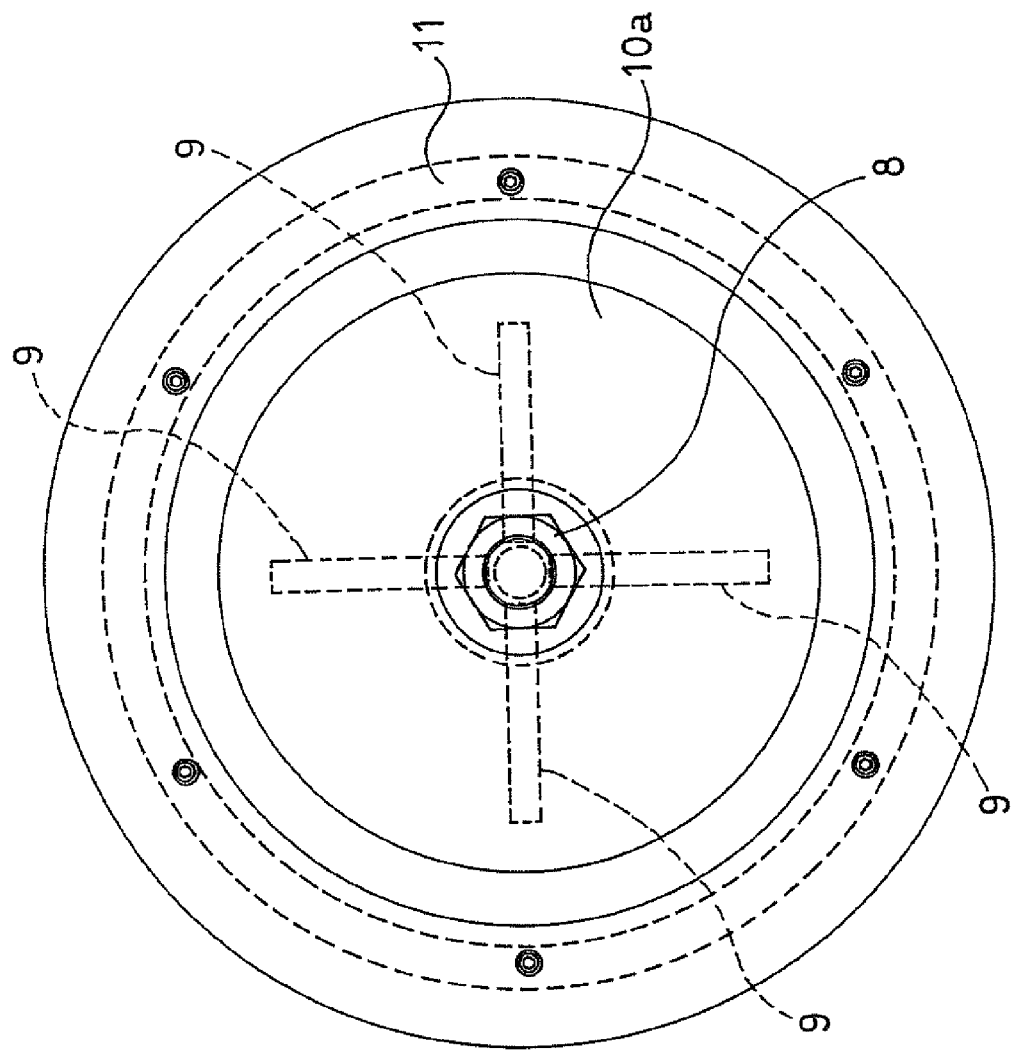
FIG. 6 is a plan view seen along arrows C-C in FIG. 5.

After the tire W is vulcanized and thus formed, or when the tire is built, the multiple sector-shaped segments 2a are pulled in a radial direction, and separated from the mount-shaped segments 2b. In the core holding mechanism 3, upper and lower support plates 10a, 10b are detachably provided to two end portions of a central shaft 8 with bolts screwed through four supporting members 9 to the plates 10a, 10b or the shaft 8, as shown in FIG. 5 and FIG. 6. Furthermore, bead rings 11 are detachably provided to peripheral portions of the upper and lower support plates 10*a*, 10*b* to hold upper-opening-edge portions 2*x* of the rigid core body 2.

Moreover, as shown in FIG. 1, FIG. 3, FIG. 7 to FIG. 9, in the elevating device 6 provided with the clamping means 6*x*, an elevating cylinder 13 is disposed to a support frame 12 and vertically on the central axis line X-X of the support table 1. The elevating cylinder 13 is to elevate the rigid core body 2 up and down, and the support frame 12 is built on the flat support table 1. Furthermore, a support plate 14 that is horizontal to the support table 1 is provided at a tip end of an elevating rod of the elevating cylinder 13.

Then, a clamp plate 16 is disposed in parallel to tip ends of multiple guide rods 15 which hang from the support plate 14 in a way that the guide rods 15 can elevate up and down. A number of clamp cylinders 17 are disposed on the clamp plate 16, the number being corresponding to the number of division for the rigid core body 2. At a tip end of a rod 17*a* of the clamp cylinder 17, a holding guide 20 and a clamp mechanism 21 are provided with a connection plate 18 in between, the connection plate 18 biased by biasing means in an open direction all the time. The holding guide 20 is capable of elevating up and down, and provided with a holding member 19 that supports the upper-opening-edge portion 2*x*, from the outside, of the rigid core body 2 being divided in plurality. The clamp mechanism 21 is capable of swinging to clamp each of a lower side surface and a bottom surface of the upper-opening-edge portion 2*x* of the rigid core body 2 being divided in plurality.

The connection plate 18 is horizontally fixed to the tip end of the rod 17*a* of the clamp cylinder 17, and also the holding guide 20 is inserted through the connection plate 18 in a way that the holding guide 20 can elevate up and down. A clamping hook 23 is provided with a supporting member 22 that is at an upper side surface of the holding member 19. The clamping hook 23 is capable of turning around to clamp the lower side surface and the bottom surface of the upper-opening-edge portion 2*x* of the rigid core body 2. The clamping hook 23 and locking means 24 provided to the connection plate 18 are connected to each other with a link 25 in a way that the clamping hook 23 and the locking means 24 are rotatable.

The energized means for the connection plate 18 is formed of an elastic member 26 such as a coil spring interposed between the connection plate 18 and the supporting member 22.

The locking means 24 is constituted of: a contact plate 27 hanging from a lower portion of the connection plate 18; and a locking hook 28 formed on the back surface of the clamping hook 23.

The pair of the core separation/removal mechanisms 7*a*, 7*b* disposed below the center of the support table 1 are mounted on a plate 30 that horizontally hangs below the central axis line X-X of the support table 1 as shown in FIG. 1 and FIG. 3. The pair of the core separation/removal mechanisms 7*a*, 7*b* is configured to elevate up to the top of the support table 1 by a vertical cylinder 31 that hangs from the plate 30

In other words, the plate 30 horizontally hangs from lower portions of the support table 1 with supporting rods 32, and the vertical cylinder 31 hangs from this plate 30 in a vertical direction. Moreover, the plate 30 is mounted with a slide table 35 that is slidable in a horizontal direction along a guide rail 34 provided on a support stand 33. Furthermore, a first hold plate 37 and a second hold plate 38 are mounted on the slide table 35 with supporting members 36 interposed therebetween. A rod 31*a* of the vertical cylinder 31 can be inserted through the supporting member 36. The first hold plate 37 and the second hold plate 38 are separating from each other at a predetermined interval in a horizontal direction. The first hold plate 37 is provided with the first core separation/removal mechanism 7*a*. The second hold plate 38 is provided with the second core separation/removal mechanism 7*b*.

Figure 10:
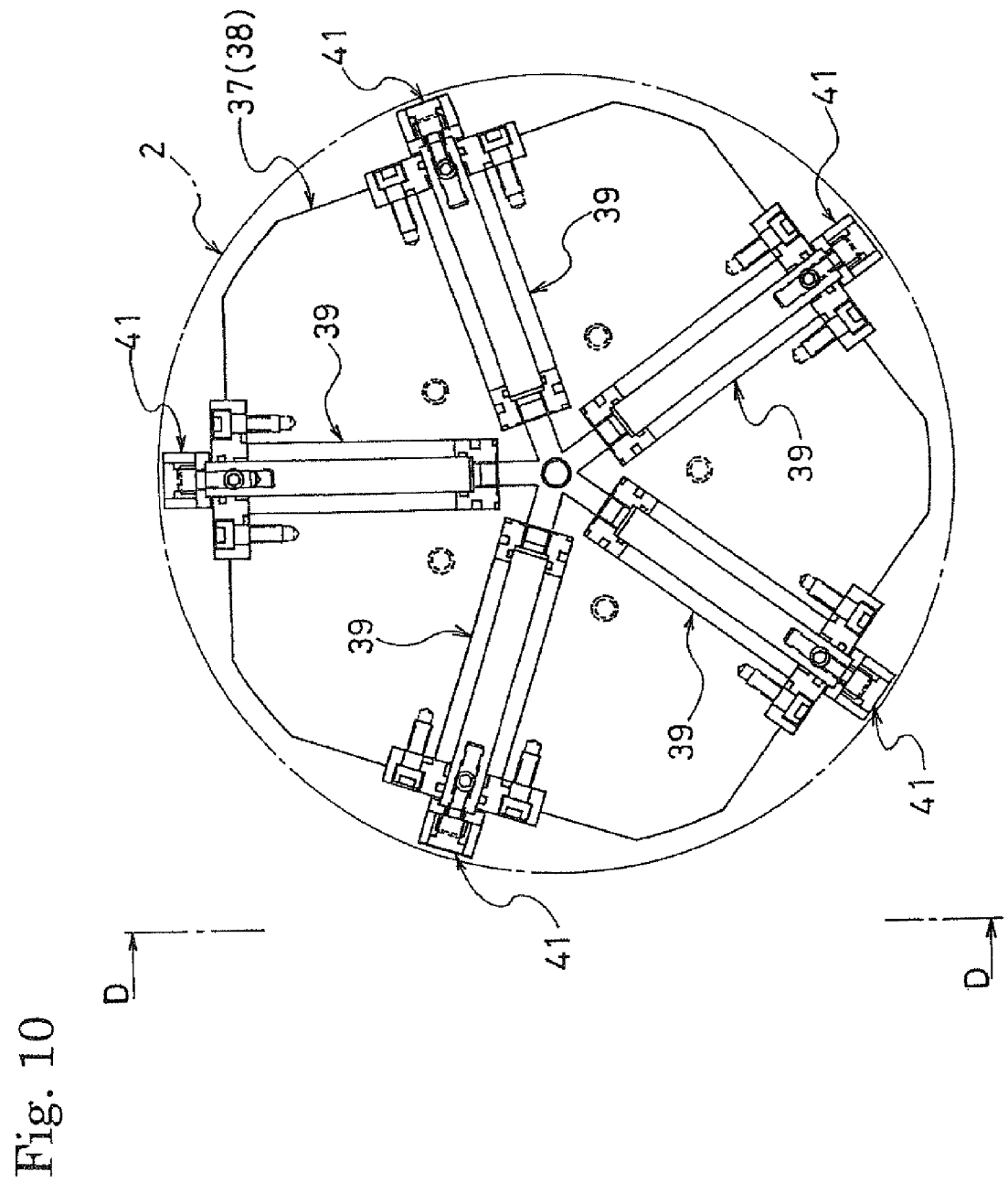
FIG. 10 is an enlarged plan view of a first hold plate in a core separation/removal mechanism.
Figure 11:
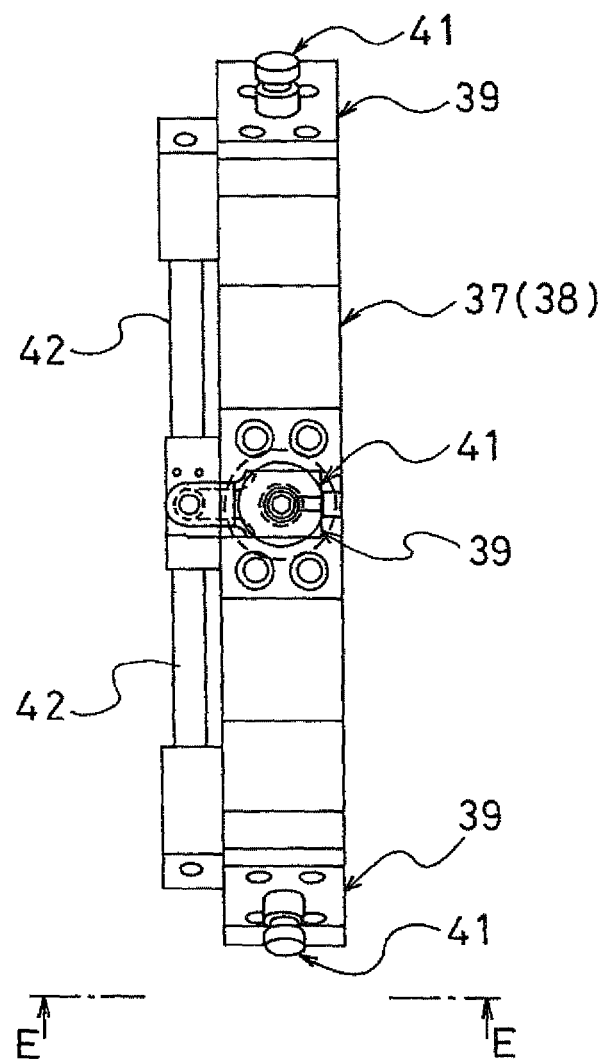
FIG. 11 is a side view seen along arrows D-D in FIG. 10.
Figure 12:
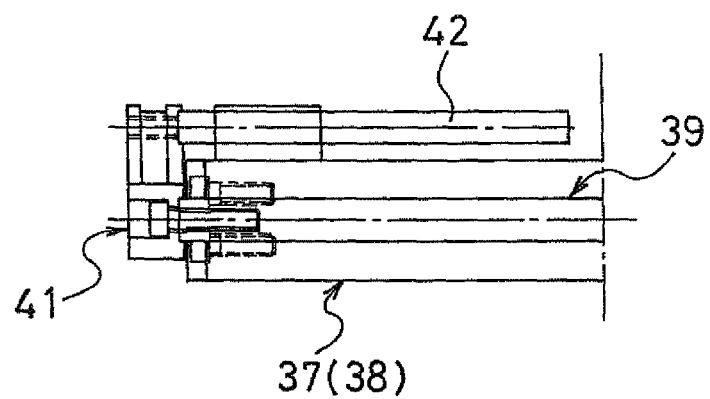
FIG. 12 is a side view seen along arrows E-E in FIG. 11.
Figure 13:
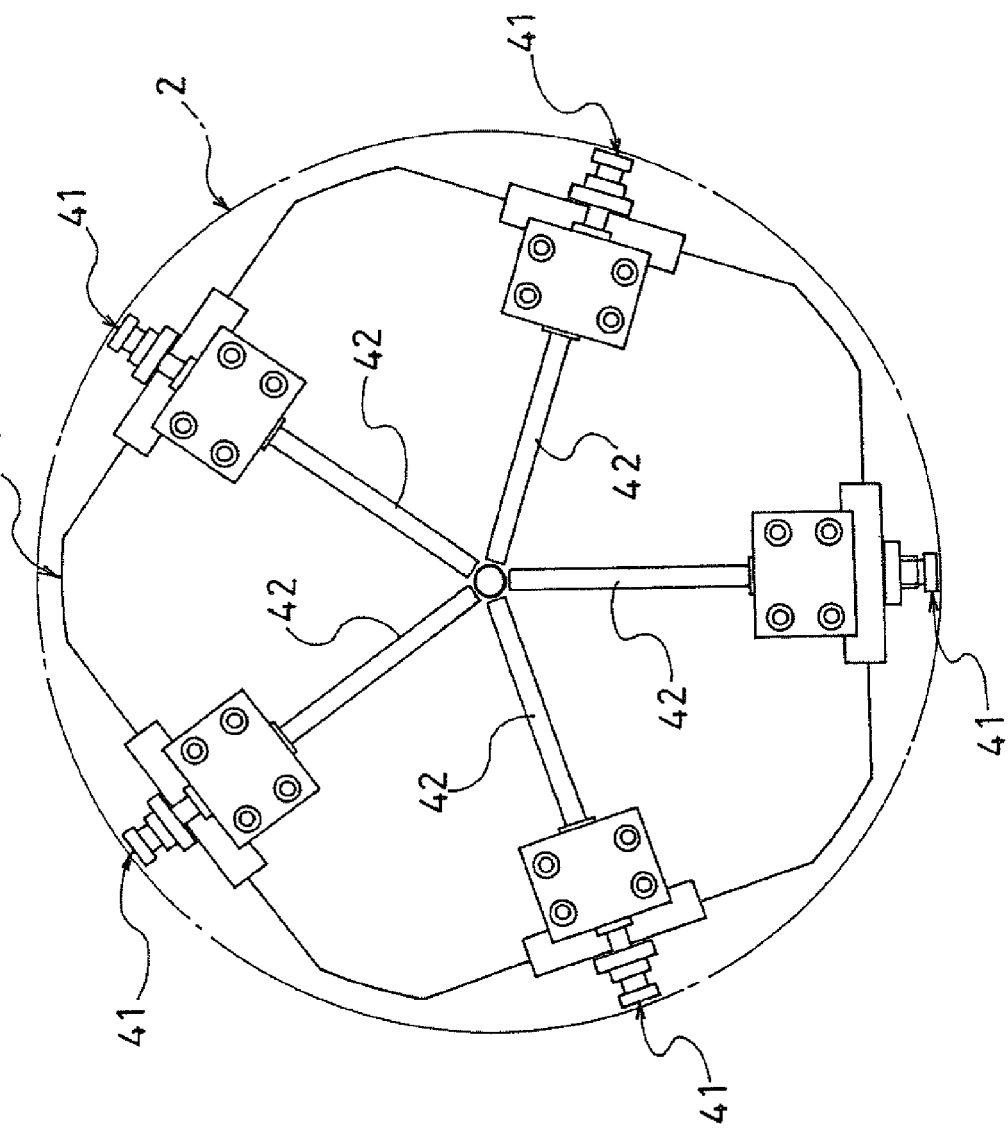
FIG. 13 is an enlarged bottom view of the first hold plate in the core separation/removal mechanism.

On each surface side of the first hold plate 37 and the second hold plate 38, as shown in FIG. 10 to FIG. 12, multiple attachment-detachment cylinders 39 are radially disposed (in this embodiment, the five attachment-detachment cylinders 39 are provided so as to correspond to the number of the sector-shaped segments 2*a* and substantially trapezoidal mount-shaped segments 2*b* which are the two types constituting the rigid core body 2). The attachment-detachment cylinders 39 either clamp or unclamp the two types of the segment groups 2A, 2B divided in plurality. Tip ends of the attachment-detachment cylinders 39 are provided with substantially T-shaped engagement members 41 that are detachable from concave-shaped engagement portions 40 (see FIG. 5). The engagement portions 40 are provided to the center of the inner wall surfaces of the segment group 2A (the five sector-shaped segments 2*a*) or the segment group 2B (the five mount-shaped segments 2*b*). Moreover, on each back surface side of the first hold plate 37 and the second hold plate 38, guide rods 42 for the attachment-detachment cylinders 39 are radially disposed.

The engagement members 41 are configured to move back and forth by the attachment-detachment cylinders 39, and also to engage with the concave-shaped engagement portions 40 formed on the inner circumferential surfaces of the segment groups 2A, 2B by the extension and contraction movements of the vertical cylinder 31 thereby to pull the segment group 2A or 2B toward the center side of the tire.

As shown in FIG. 2, at five spots around the central position X-X on the support table 1, locking cylinders 43 are respectively provided to the multiple tire positioning means 5 which hold the outer circumferential surface of the tire W to perform centering. Tip ends of rods of the locking cylinders 43 are respectively connected to locking arms 45 with cranked arms 44. The locking arms 45 are to lock the five spots on the outer circumferential surface of the tire W which accommodates the rigid core body 2.

When the locking cylinders 43 are caused to contract, the cranked arms 44 turn clockwise around the respective fulcrums O. Thus, tip ends of the locking arms 45 clamp and position the five spots on the outer circumferential surface of the tire W. When the locking cylinders 43 are caused to extend, the cranked arms 44 turn counterclockwise around the respective fulcrums O. Thus, the tip ends of the locking arms 45 are separated from the outer circumferential surface of the tire W, so that the locked condition is released.

Next, a method for separating and removing a rigid core for building a tire will be described with reference to FIG. 14 to FIG. 23.

Figure 14:
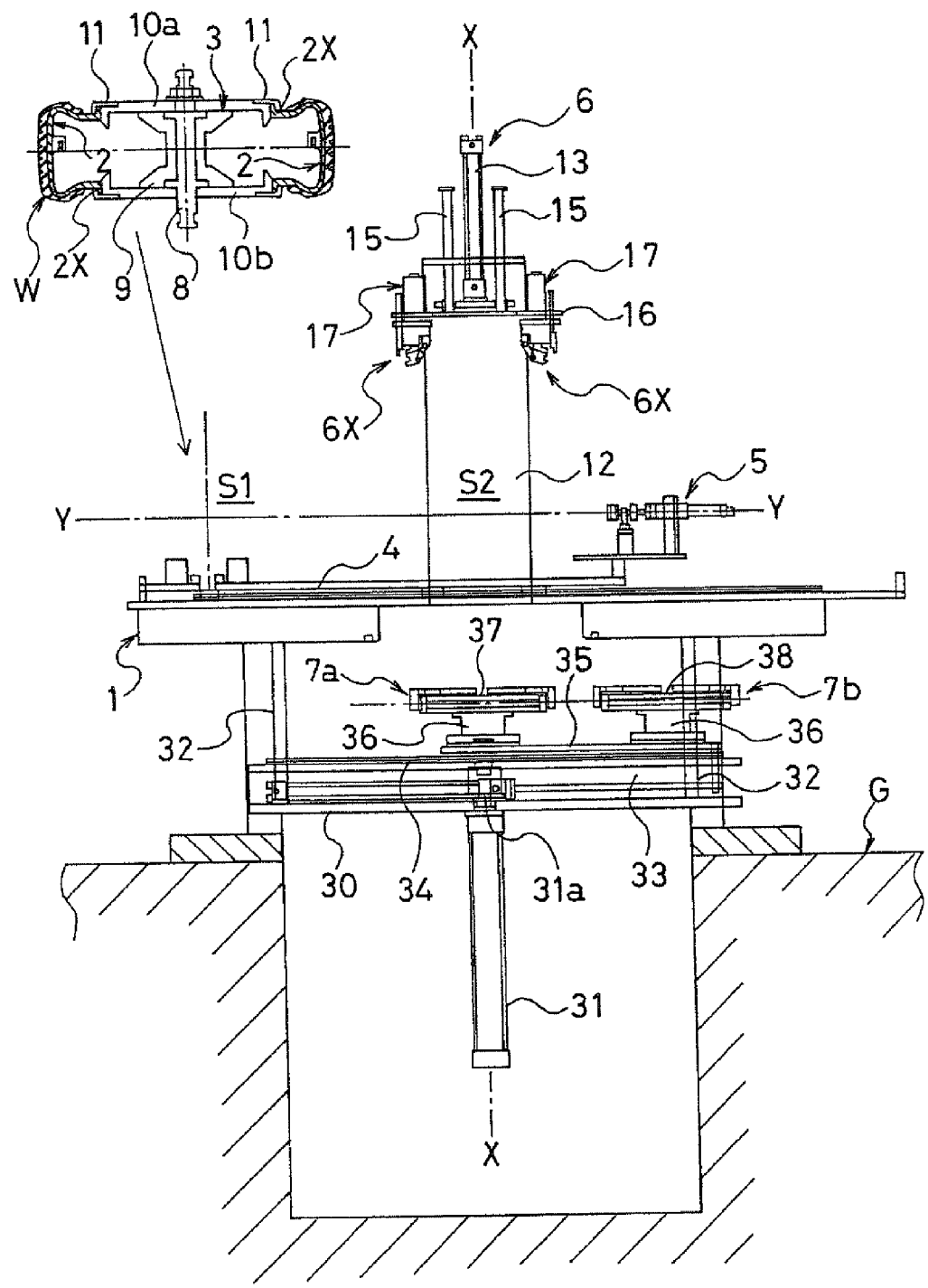
FIG. 14 is an explanatory drawing for a first step of a method for separating and removing a rigid core for building a tire according to a first embodiment of the present invention.

First of all, in a first step shown in FIG. 14, when a tire is built, the tire W together with the core holding mechanism 3 is conveyed onto a first stage S1 on the support table 1 by an unillustrated convey device, and fixed to a predetermined position. The tire W either has been vulcanized or has not been vulcanized, and has been formed on the outer circumferential surface of the rigid core body 2 composed of the two types of the segment groups 2A, 2B.

Figure 15:
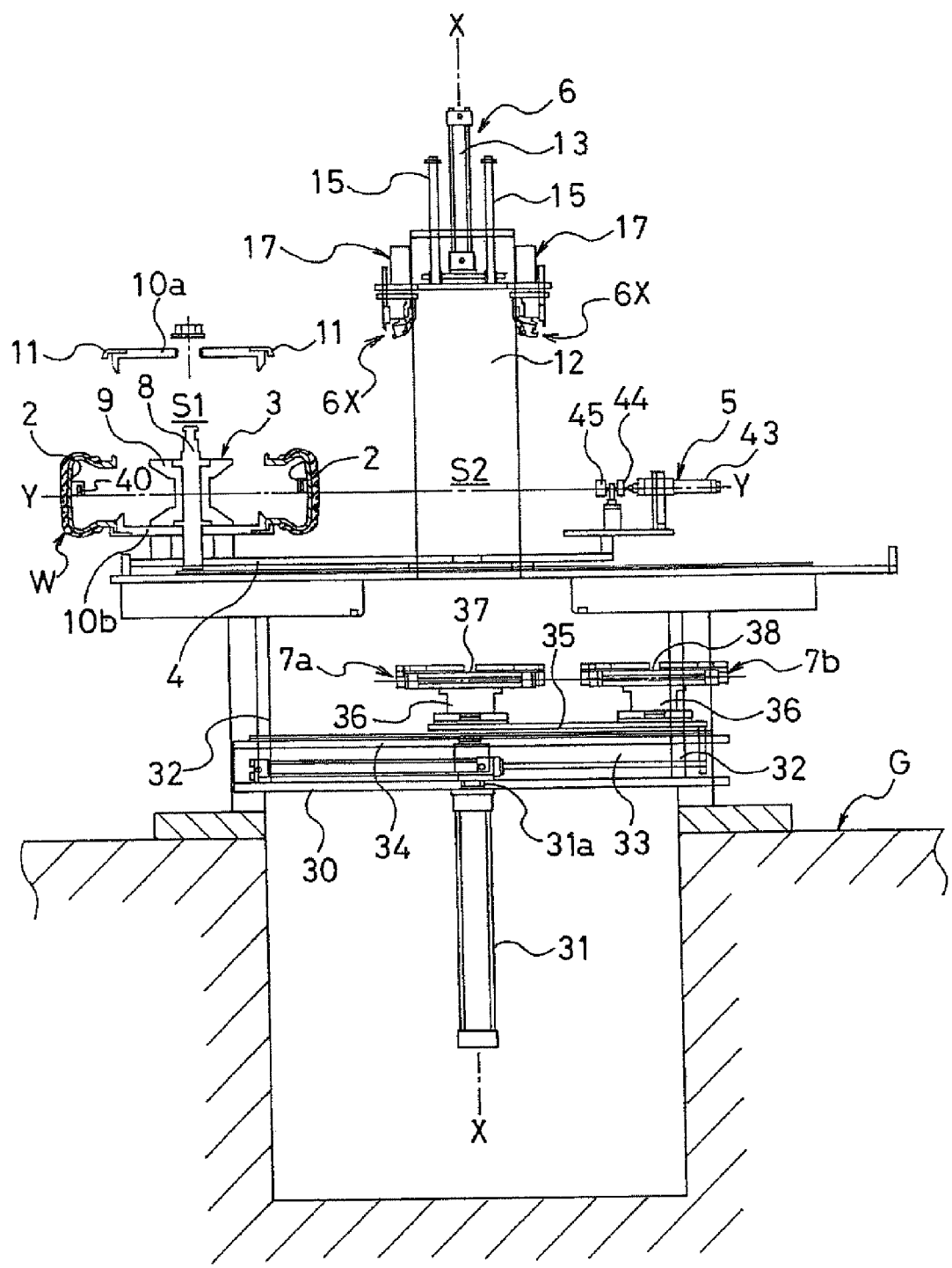
FIG. 15 is an explanatory drawing for a second step according to the first embodiment.
Figure 16:
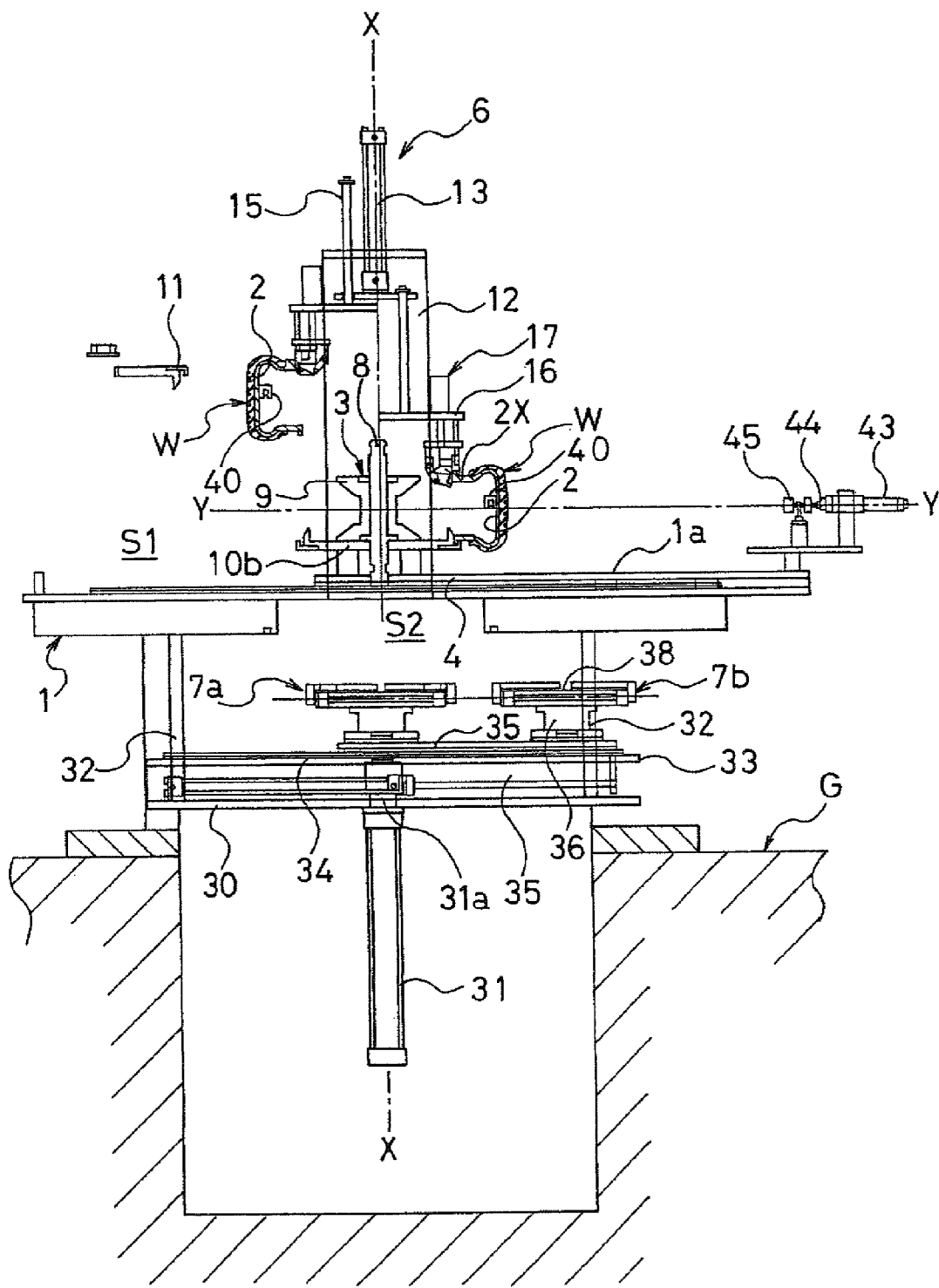
FIG. 16 is an explanatory drawing for a third step according to the first embodiment.
Figure 17:
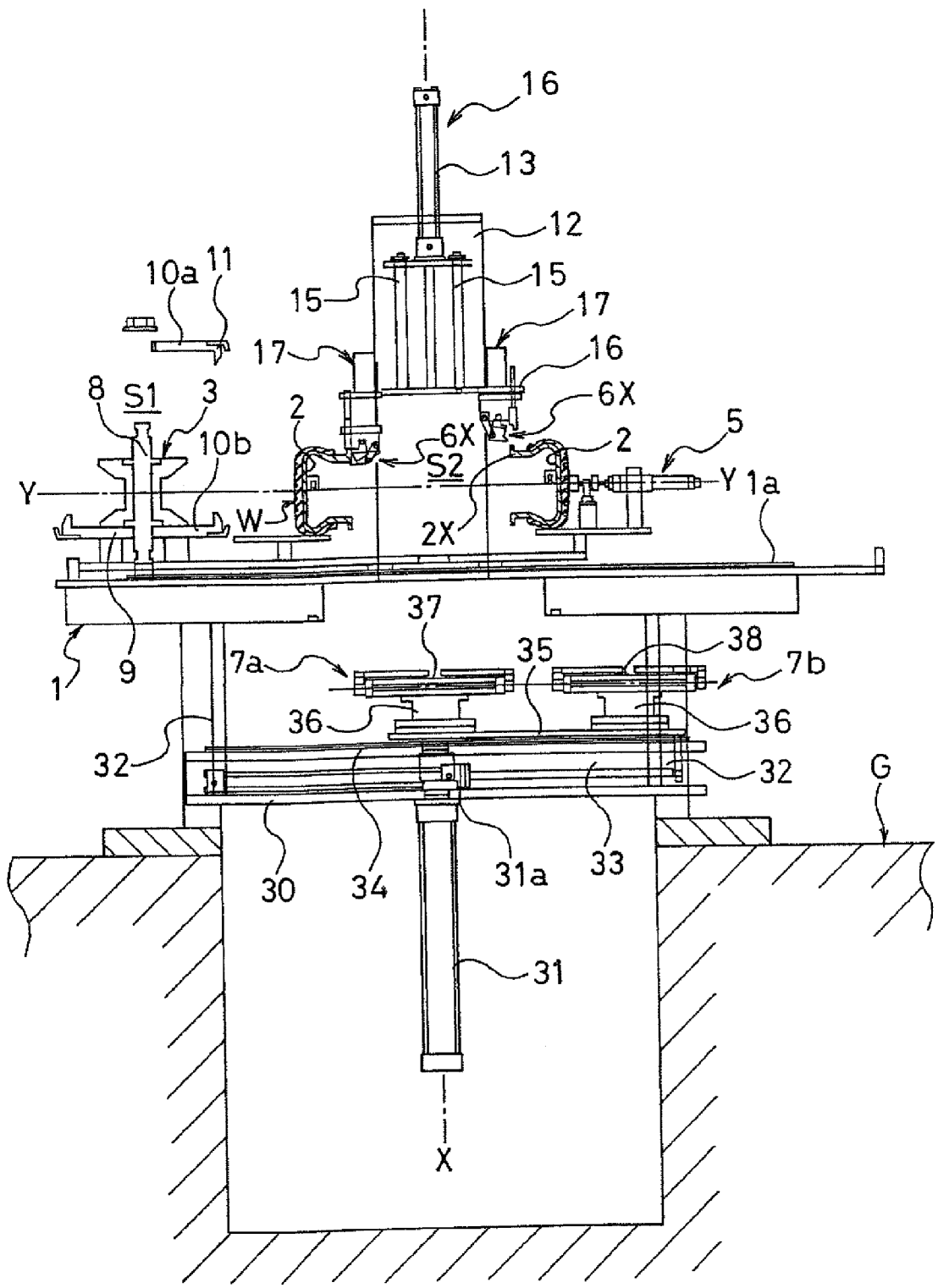
FIG. 17 is an explanatory drawing for a fourth step according to the first embodiment.

Then, as shown in FIG. 15, on the first stage S1 of the support table 1, the support plate 10*a* on the supporting member 9 and the bead ring 11 are separated from the core holding mechanism 3 by removing a nut that fixes the bead ring 11 and the support plate 10*a* to the upper portion of the core holding mechanism 3. Thus, the upper parts of the rigid core body 2 and the tire W become free from the core holding mechanism 3. Subsequently, the resultant tire W and rigid core body 2 that are held by the core holding mechanism 3 and the support plate 10b on the supporting member 9 are transferred along the guide rail 1a to a central position X-X on a second stage S2 of the support table 1.

When the tire W and the rigid core body 2 held by the core holding mechanism 3 are transferred to and stopped at the central line X-X position on the second stage S2, the elevating device 6 on standby at a central line X-X position on the second stage S2 is lowered to clamp the upper-opening-edge portions 2x of the rigid core body 2 with the clamping means 6x. Then, the elevating device 6 is raised to pull up the rigid core body 2 and the tire W from the core holding mechanism 3 (left side of FIG. 16 from the central line of the drawing).

Figure 7:
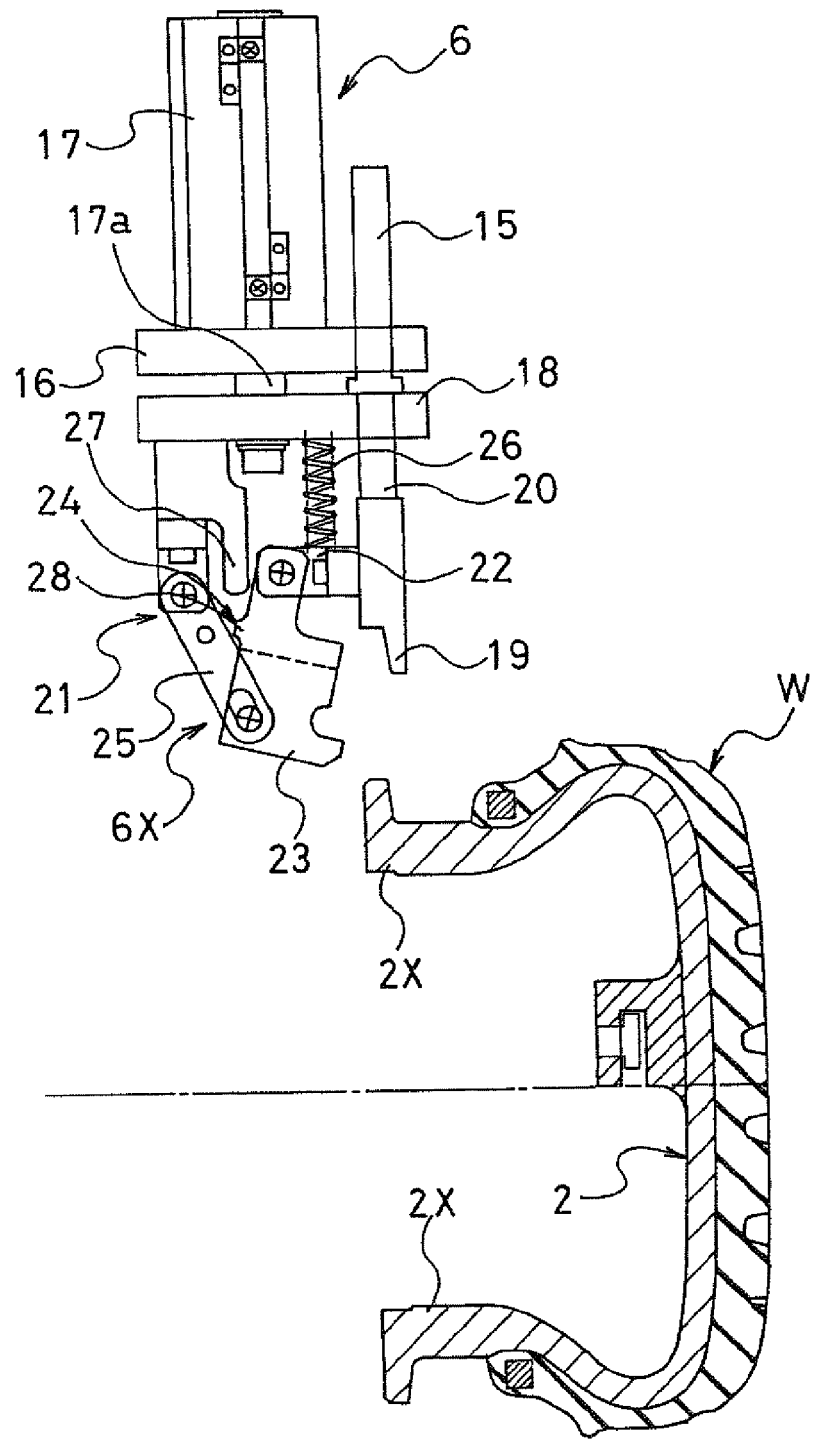
FIG. 7 is an enlarged cross-sectional view of an elevating device provided with clamping means which clamps an upper-opening-edge portion of the rigid core body.
Figure 8:
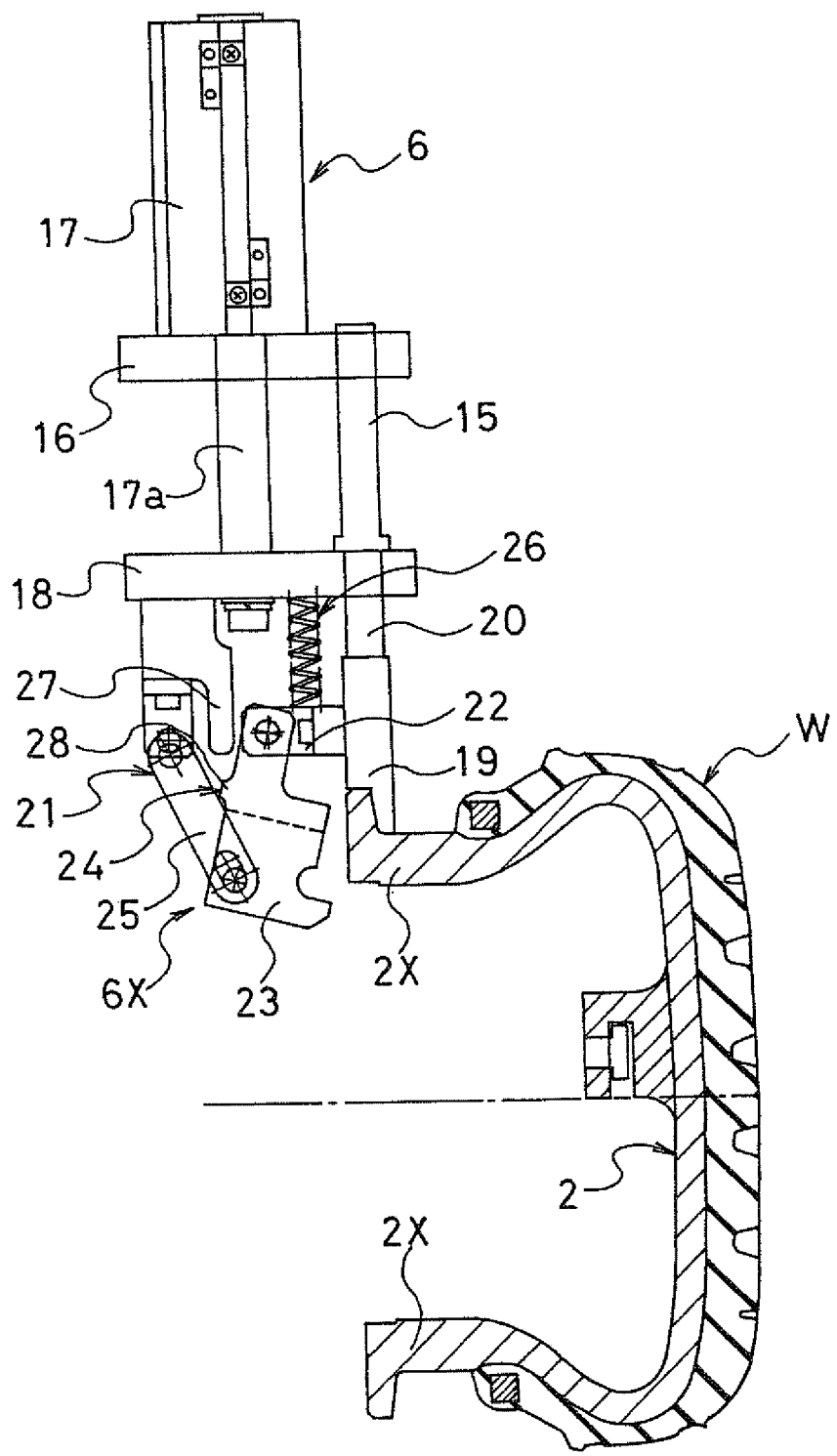
FIG. 8 is an explanatory drawing for the clamping means of FIG. 7 in operation.
Figure 9:
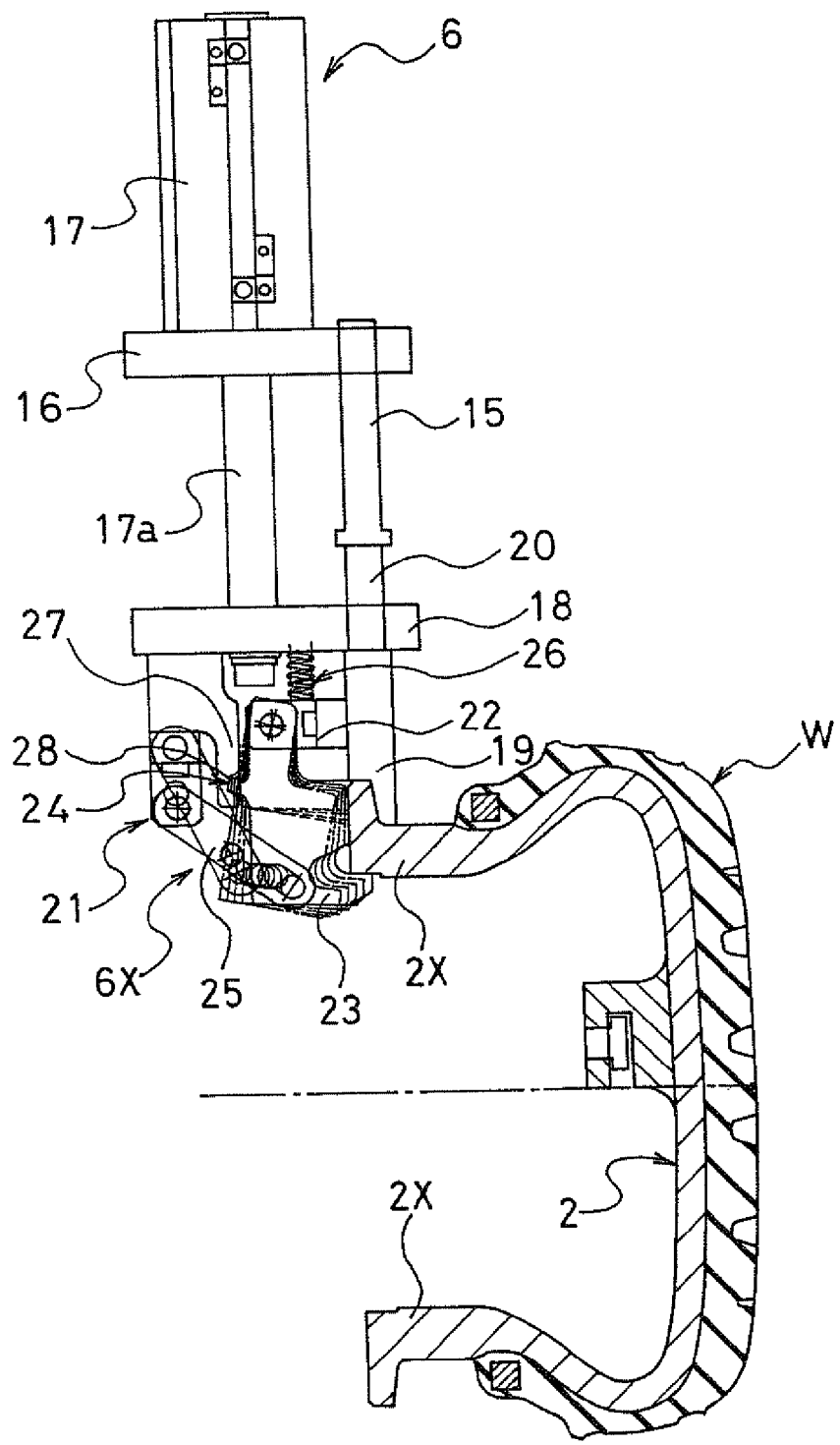
FIG. 9 is an explanatory drawing for the clamping means of FIG. 7 in operation.

Specifically, in the operation of clamping the upper-opening-edge portion 2x of the rigid core body 2 with the clamping means 6x, as shown in FIG. 7 to FIG. 9 and described above, the clamp cylinder 17 is caused to extend toward the clamping means 6x that is lowered to a predetermined position by the elevating device 6. Thus, as shown in FIG. 8, the holding member 19 first comes into contact with the upper-opening-edge portion 2x, from the outside, of the rigid core body 2. Subsequently, the clamping hook 23 turns around so as to clamp the lower side surface and the bottom surface of the upper-opening-edge portion 2x of the rigid core body 2 from the inside as shown in FIG. 9.

Thereafter, the clamping means 6x clamp the upper-opening-edge portions 2x of the rigid core body 2, and the rigid core body 2 and the tire W are pulled upward, while separating from the core holding mechanism 3. At this point, only the core holding mechanism 3 is returned onto the first stage 51 on the support table 1. Meanwhile, the rigid core body 2 and the tire W thus hanged are mounted onto the central position X-X of the second stage S2 by the elevating device 6 and the clamping means 6x (see FIG. 17 and FIG. 18).

Figure 18:
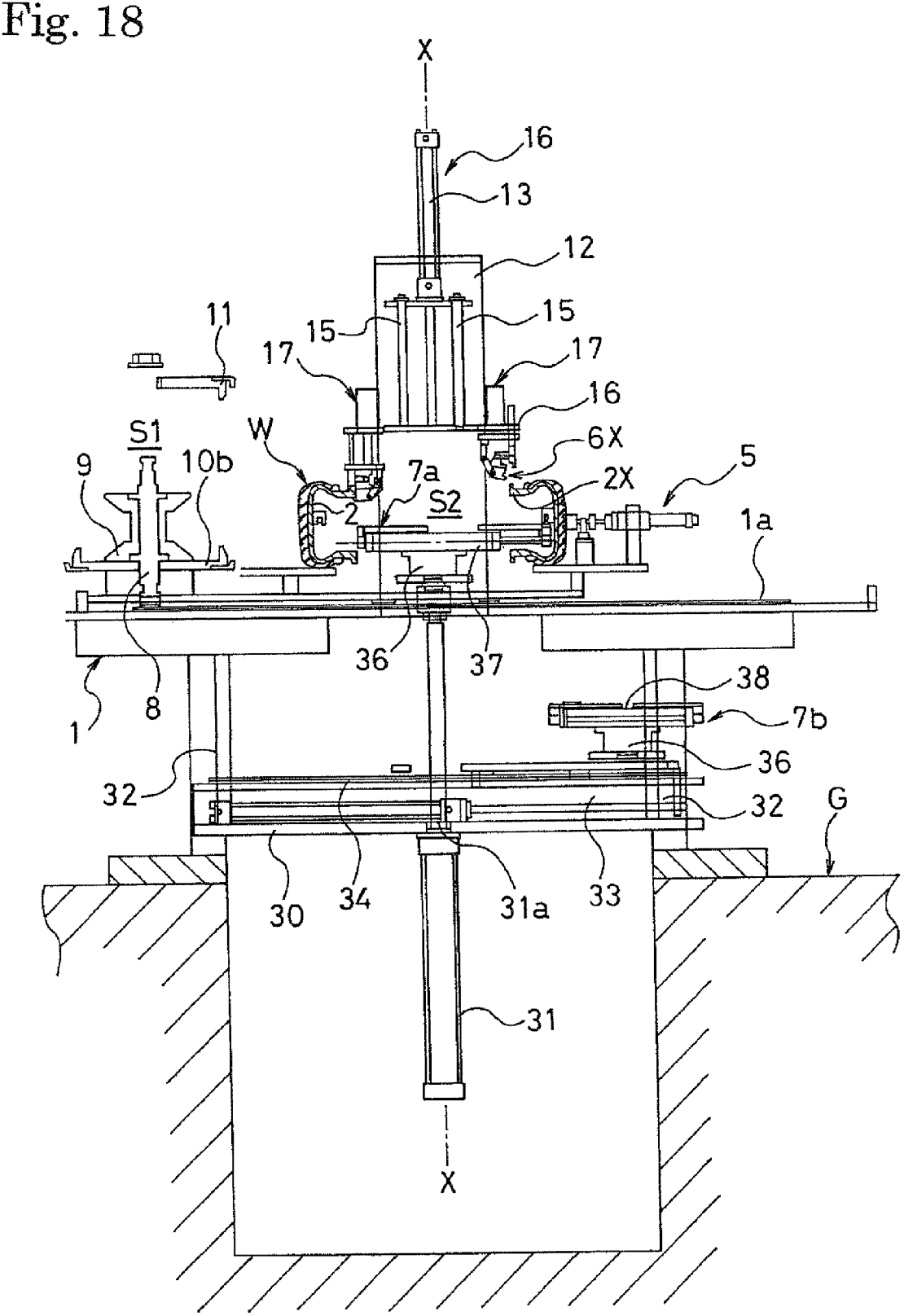
FIG. 18 is an explanatory drawing for a fifth step according to the first embodiment.

When the rigid core body 2 is separated and removed from the inside of the tire W, as shown in FIG. 18, the tire W is centered by the multiple (in this embodiment, five) tire positioning means 5 provided on the outer circumference of the central position X-X of the second stage S2. Moreover, the five spots on the outer circumferential surface of the tire are grasped, and then positioned and fixed. More specifically, as shown in FIG. 2, the locking cylinders 43 are caused to contract, and the cranked arms 44 are turned clockwise around the fulcrums O. Thus, the tip ends of the locking arms 45 clamp and position the five spots on the outer circumferential surface of the tire W.

Figure 19:
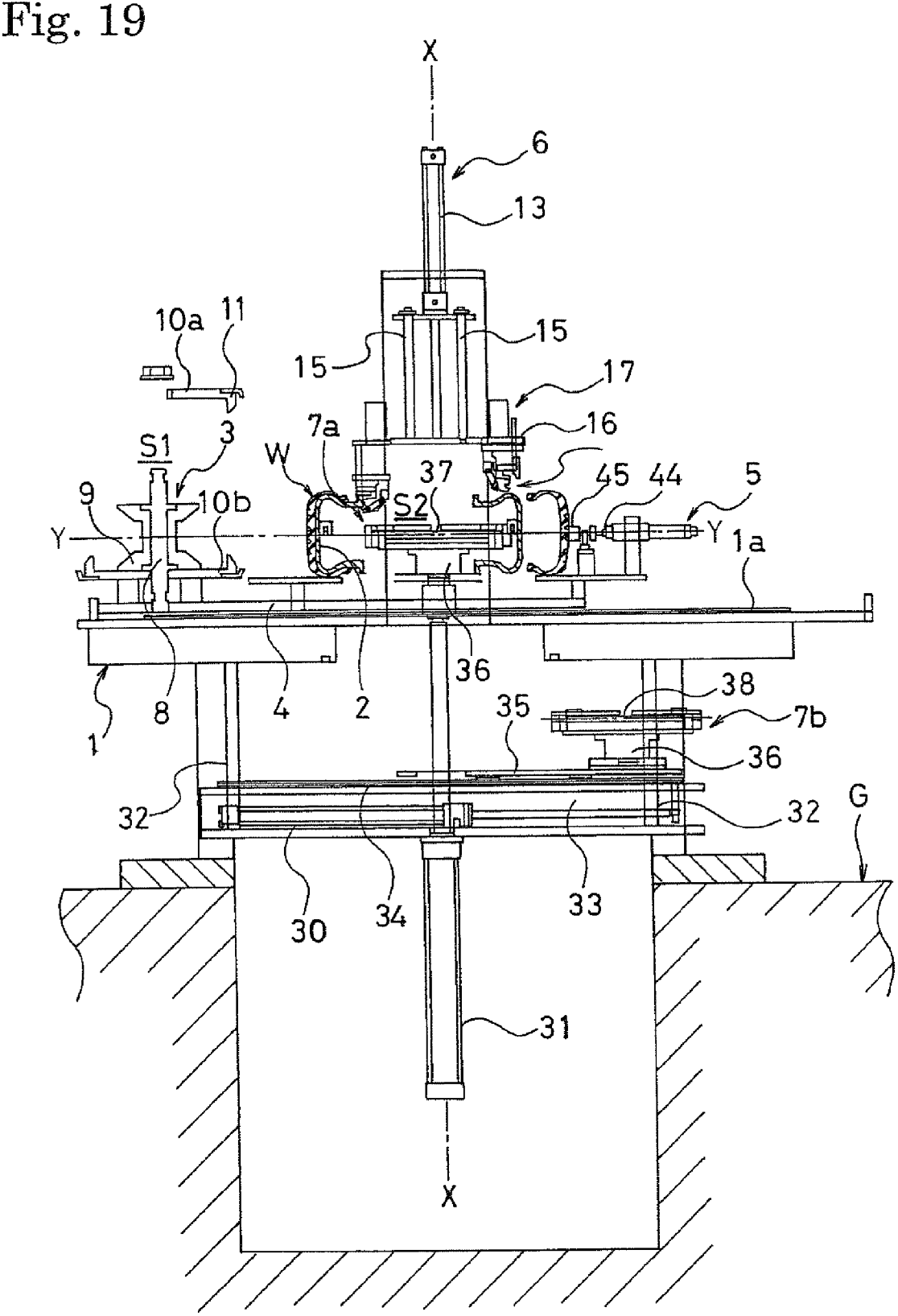
FIG. 19 is an explanatory drawing for a sixth step according to the first embodiment.
Figure 20:
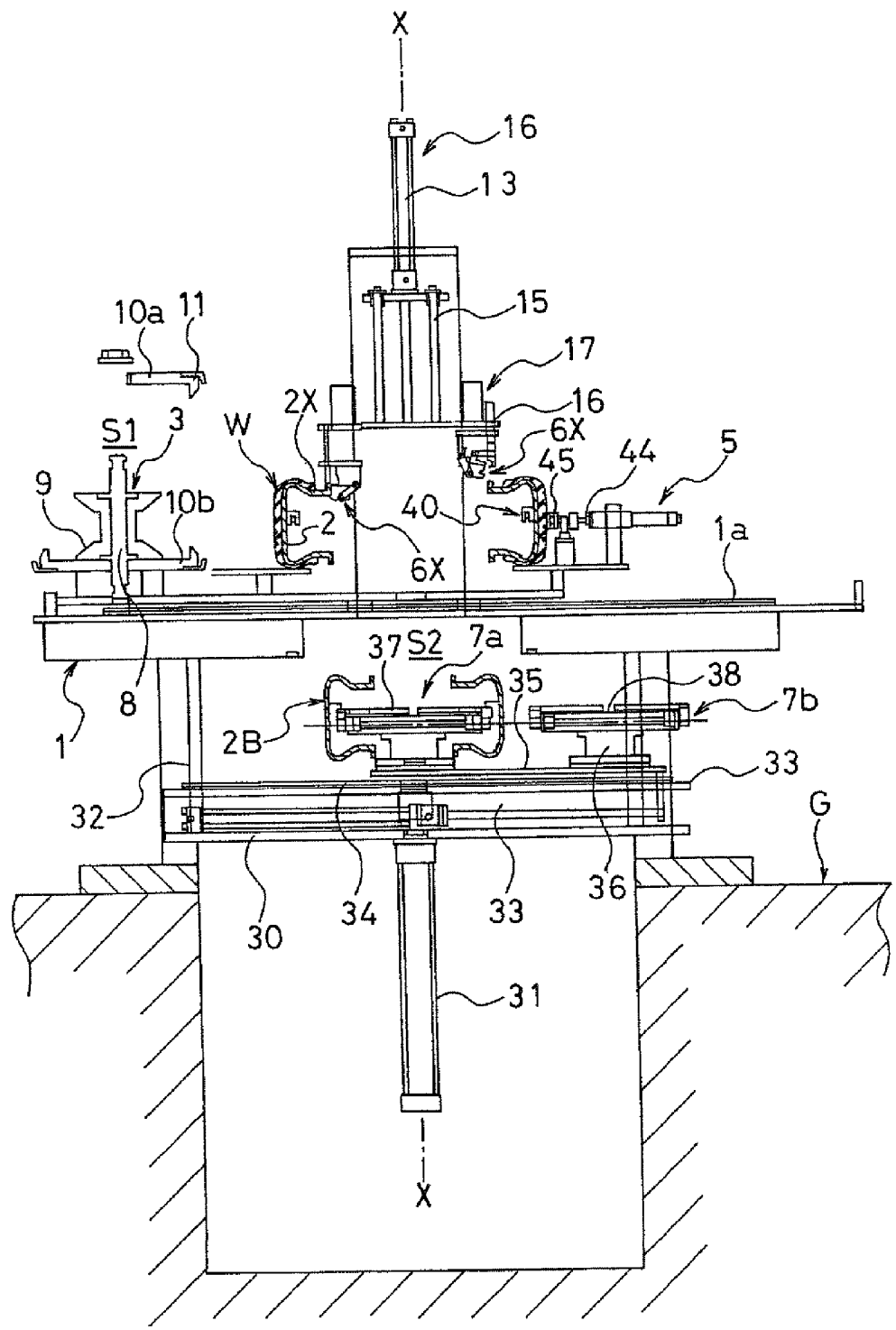
FIG. 20 is an explanatory drawing for a seventh step according to the first embodiment.
Figure 21:
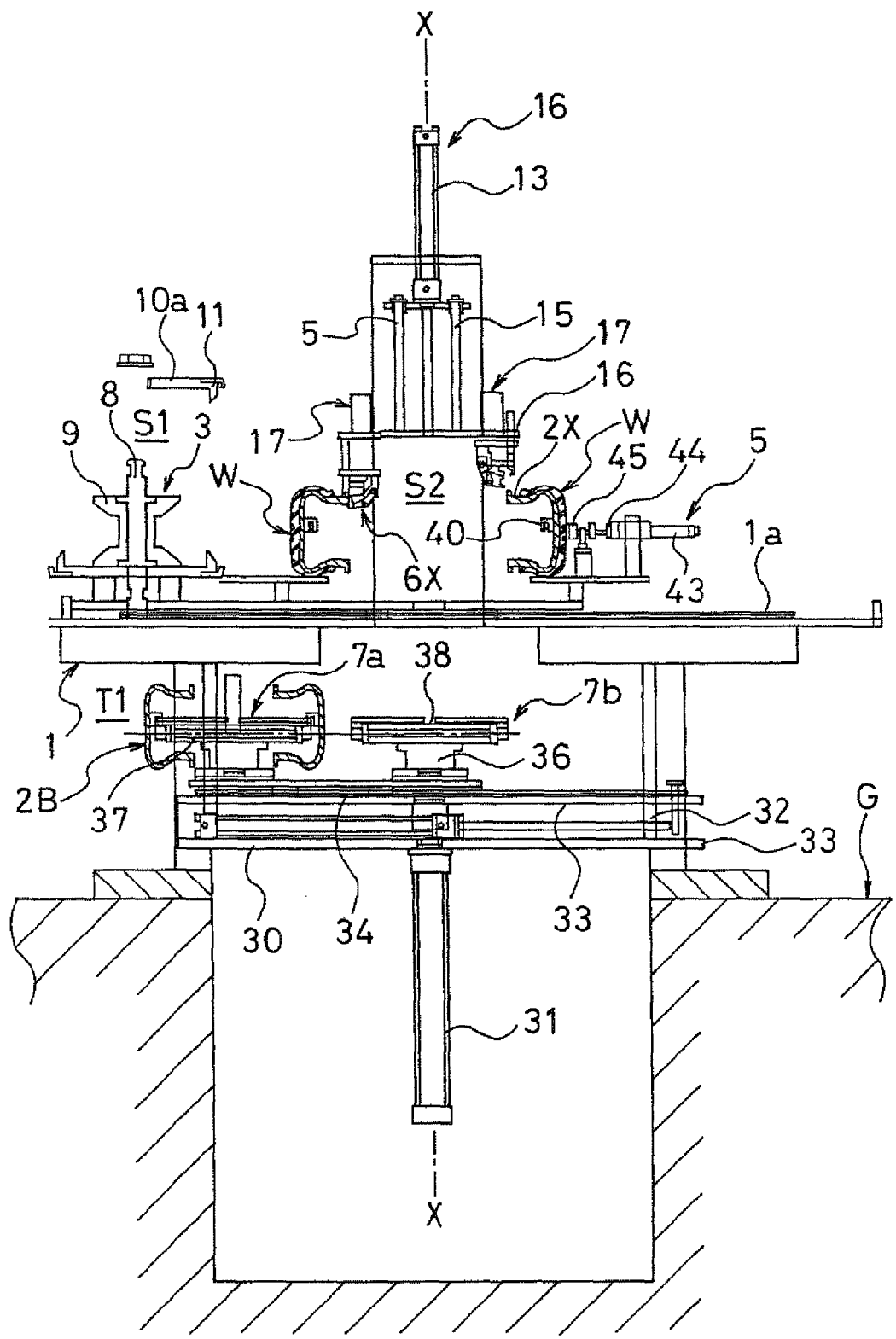
FIG. 21 is an explanatory drawing for an eighth step according to the first embodiment.

After that, from such a state, the first core separation/removal mechanism 7a having been on standby below the center of the tire on the support table 1 is raised, by extending the vertical cylinder 31, to a portion slightly lower than a center Y-Y of the height position of the rigid core body 2, the portion being inside the rigid core body 2 as shown in FIG. 19. Then, by extending the attachment-detachment cylinders 39 radially disposed on the first hold plate 37, the T-shaped engagement members 41 provided to the tip ends of the attachment-detachment cylinders 39 are positioned to lower sides of the concave-shaped engagement portions 40 provided to the center of the inner wall surfaces of the segment group 2B (the five mount-shaped segments 2b) of the rigid core body 2. In such a state, when the first hold plate 37 is raised by the vertical cylinder 31, the T-shaped engagement members 41 engage with the concave-shaped engagement portions 40.

In this state, when the attachment-detachment cylinders 39 are caused to contract, the segment group 2B (the five mount-shaped segments 2b) are simultaneously pulled to the central position X-X side of the second stage S2, and then transferred to a position which is within the inner diameter portion of the tire W, and which does not interfere therewith (see FIG. 19). Then, this segment group 2B (the five mount-shaped segments 2b) is lowered onto the plate 35 by contracting the vertical cylinder 31, while being held by the first core separation/removal mechanism 7a on the first hold plate 37 (see FIG. 20).

In this state, the segment group 2B held by the first core separation/removal mechanism 7a on the first hold plate 37 is transferred to a standby position T1 of the slide table 35 by a cylinder and the like. Moreover, the second core separation/removal mechanism 7b is transferred to a position below the central position X-X of the second stage S2 (see FIG. 21).

Subsequently, as in the case of the first core separation/removal mechanism 7a, the second core separation/removal mechanism 7b is raised, by extending the vertical cylinder 31, to the portion slightly lower than the center Y-Y of the height position of the rigid core body 2, the portion being inside the rigid core body 2. Then, by extending the attachment-detachment cylinders 39 radially disposed on the second hold plate 38, the T-shaped engagement members 41 provided to the tip ends of the attachment-detachment cylinders are positioned to lower sides of the concave-shaped engagement portions 40 provided to the center of the inner wall surfaces of the segment group 2A (the five sector-shaped segments 2a) of the rigid core body 2. In such a state, when the second hold plate 38 is raised by the vertical cylinder 31, the T-shaped engagement members 41 engage with the concave-shaped engagement portions 40.

Figure 22:
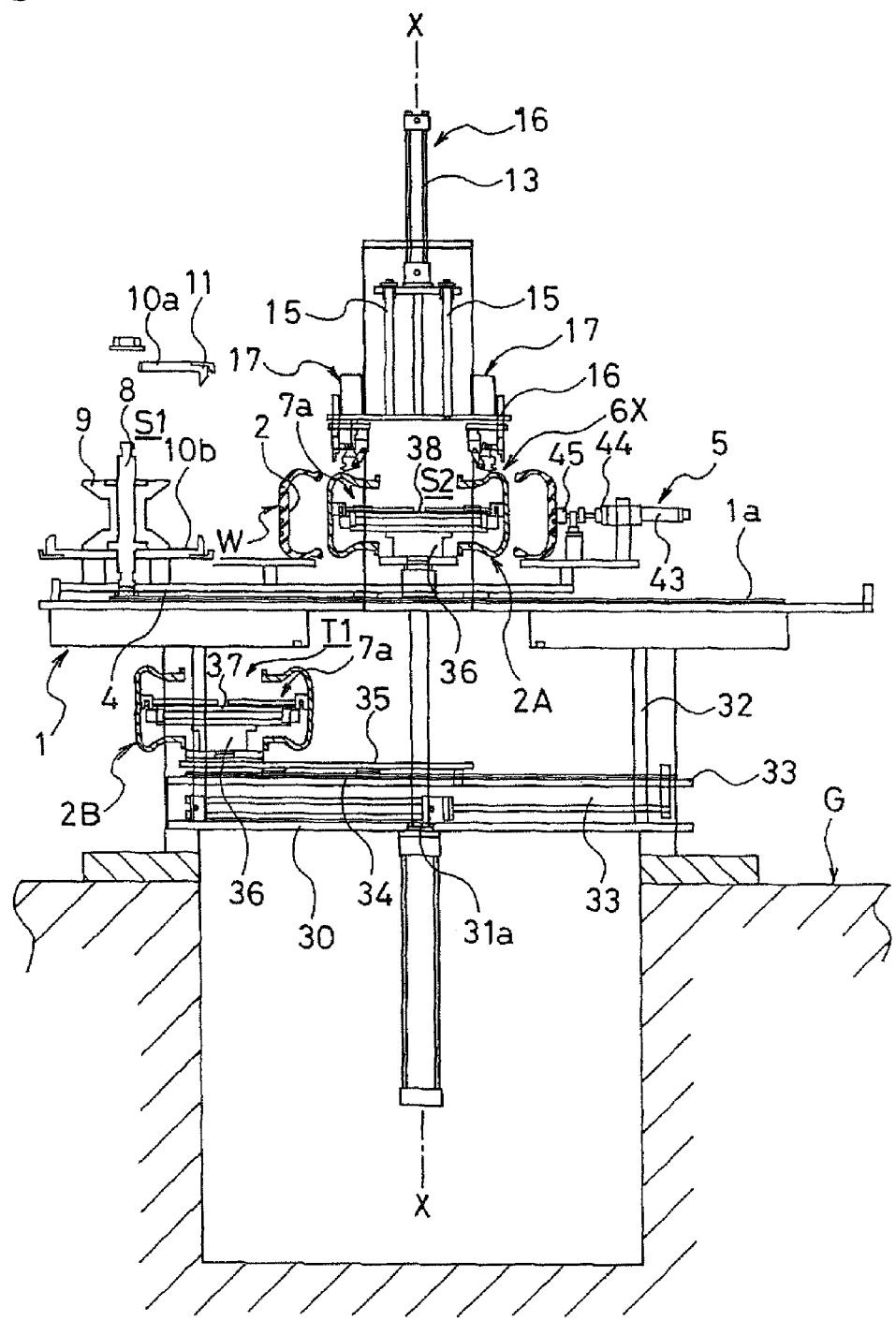
FIG. 22 is an explanatory drawing for a ninth step according to the first embodiment.
Figure 23:
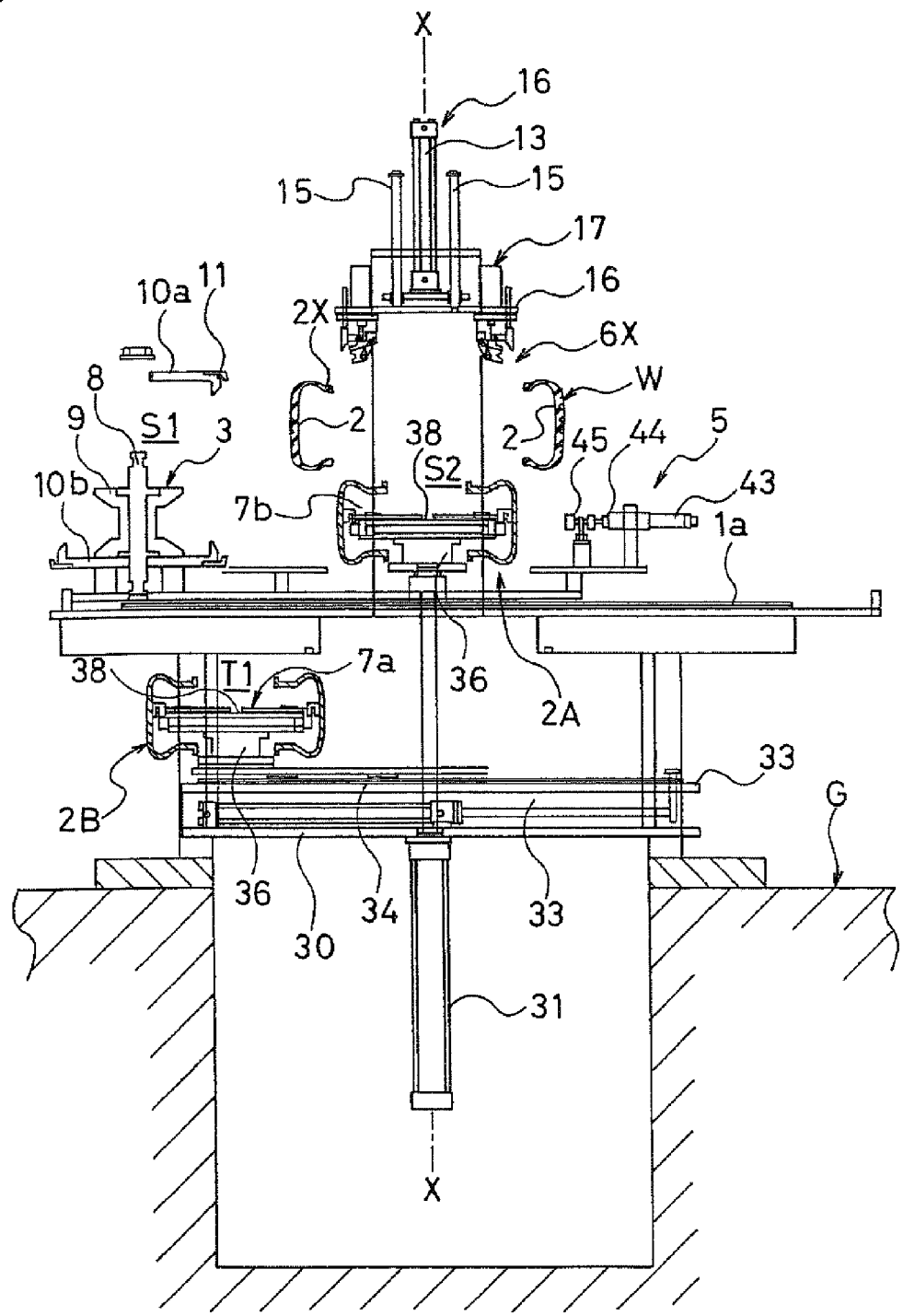
FIG. 23 is an explanatory drawing for a tenth step according to the first embodiment.

In this state, when the attachment-detachment cylinders 39 are caused to contract, the segment group 2A (the five sector-shaped segments 2a) are simultaneously pulled to the central position X-X side of the second stage S2, and then transferred to the position which is within the inner diameter portion of the tire W, and which does not interfere therewith (see FIG. 22). After the segment groups 2A and 2B of the rigid core body 2 are completely separated and removed from the inner surface of the tire W, the tire W is pulled out from the outside of the rigid core body 2 as shown in FIG. 23. The tire W is conveyed to the subsequent process by an unillustrated convening device.

Meanwhile, in a case of assembling the segment groups 2A and 2B of the rigid core body 2, which have been separated and divided as described above, by reversely performing the above-described operations of separating and dividing the segment groups 2A and 2B, the segment groups 2A and 2B can be easily assembled. To be more specific, the segment group 2A (the five sector-shaped segments 2a) is transferred in the radial direction by the attachment-detachment cylinders 39 to be disposed in a circular form. The segment group 2B (the five mount-shaped segments 2b) on standby at the standby position T1 of the slide table 35 is transferred below the central position X-X of the second stage S2, and raised by the vertical cylinder 31. Then, by extending the attachment-detachment cylinders 39 with the segment group 2A being held, the segment group 2A is placed within the segment group 2B. Thus, the cylindrical rigid core body 2 is assembled.

Next, a second embodiment will be illustrated with FIG. 24 to FIG. 29. In the second embodiment, above the rod 31a of the vertical cylinder 31 provided below the central position X-X of the support table 1, the first core separation/removal mechanism 7a and the second core separation/removal mechanism 7b, are vertically disposed, while separating from each other at a predetermined interval. The multiple attachment-detachment cylinders 39 are radially disposed (in this embodiment, the five attachment-detachment cylinders 39 are provided so as to correspond to the segment groups 2A and 2B) to the first hold plate 37 for the first core separation/removal mechanism 7a and to the second hold plate for the second core separation/removal mechanism 7b, respectively.

Figure 24:
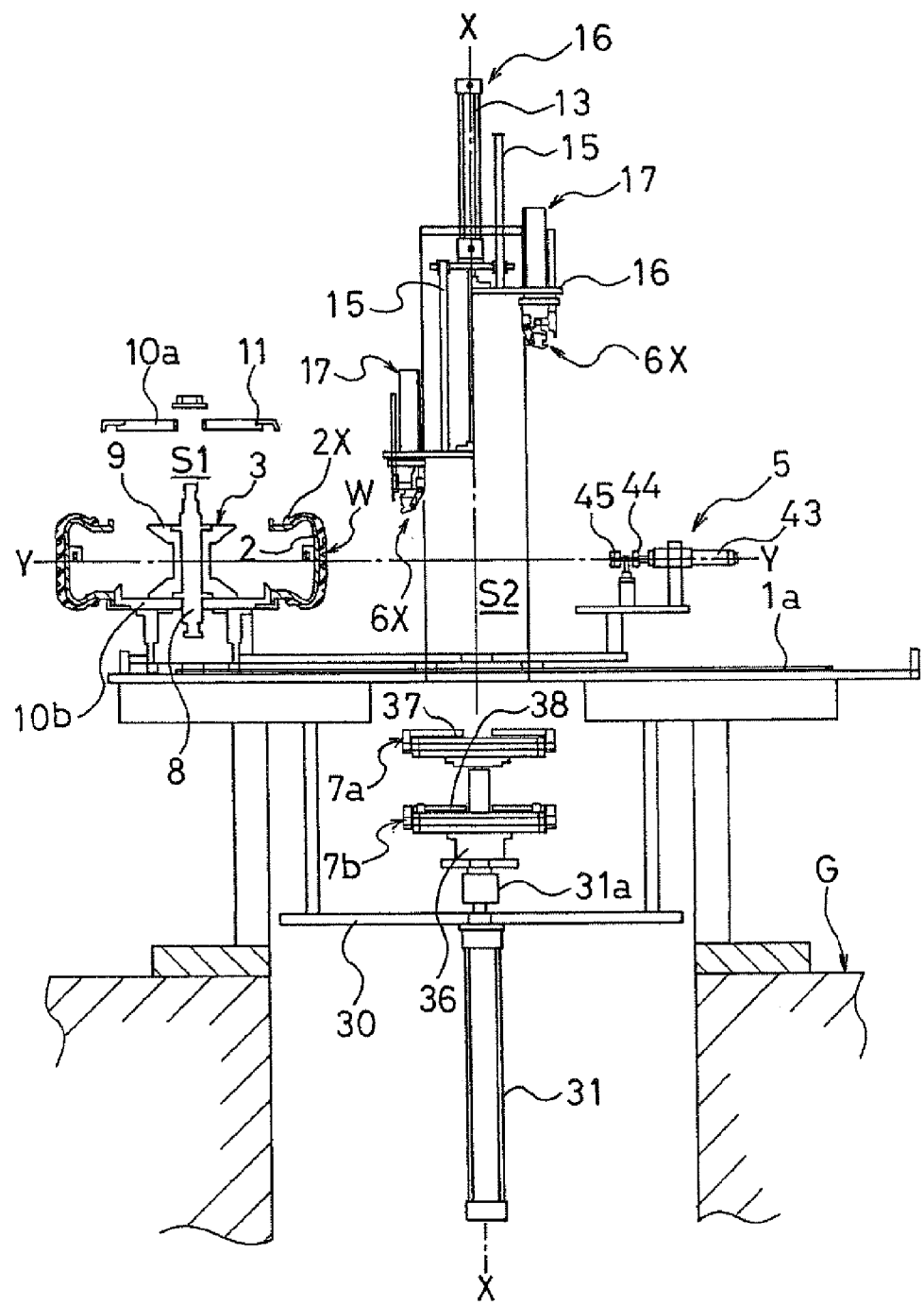
FIG. 24 is an explanatory drawing for a first step of a method for separating and removing a rigid core for building a tire according to a second embodiment of the present invention.
Figure 25:
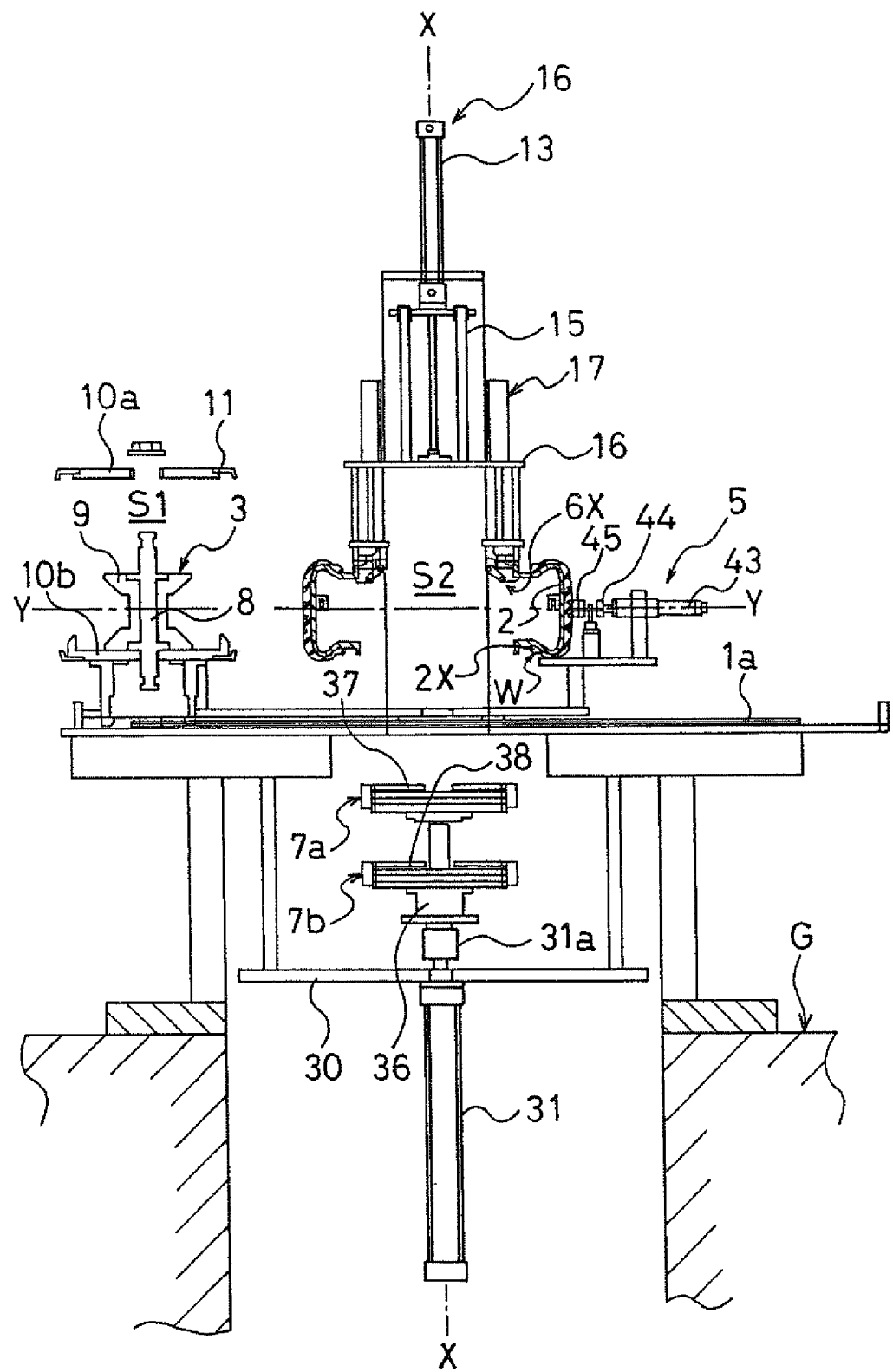
FIG. 25 is an explanatory drawing for a second step according to the second embodiment.

In a method for separating and removing a rigid core for building a tire according to the second embodiment, as in the first embodiment, the core holding mechanism 3 is removed from the rigid core body 2 disposed in the tire W, and the upper and lower support plates 10a and 10b are removed from the supporting member 9, on the first stage S1 of the support table 1 (see FIG. 24). Then, the tire W and the rigid core body 2 are caused to slide onto the central position X-X of the second stage S2 on the support table 1, and be positioned.

In this state, the elevating device 6 on standby above the central line X-X position of the second stage S2 is lowered to clamp the upper-opening-edge portions 2x of the rigid core body 2 with the clamping means 6x. Then, the elevating device 6 is raised to pull up the rigid core body 2 and the tire W from the core holding mechanism 3. Specifically, in the operation of clamping the upper-opening-edge portion 2x of the rigid core body 2 with the clamping means 6x, as shown in FIG. 7 to FIG. 9 and described above, the clamp cylinder 17 is caused to extend toward the clamping means 6x that is lowered to the predetermined position by the elevating device 6. Thus, as shown in FIG. 8, the holding member 19 first comes into contact with the upper-opening-edge portion 2x, from the outside, of the rigid core body 2. Subsequently, the clamping hook 23 turns around so as to clamp the lower side surface and the bottom surface of the upper-opening-edge portion 2x of the rigid core body 2 from the inside as shown in FIG. 9.

The clamping means 6x clamp the upper-opening-edge portions 2x of the rigid core body 2, and the rigid core body 2 and the tire W are pulled upward, while separating from the core holding mechanism 3. At this point, only the core holding mechanism 3 is returned onto the first stage S1 on the support table 1. Meanwhile, the rigid core body 2 and the tire W thus hanged are mounted onto the central position X-X of the second stage S2 by the elevating device 6 and the clamping means 6x (see FIG. 25).

When the rigid core body 2 is separated and removed from the inside of the tire W, as in the first embodiment, the tire W is centered by the multiple (in this embodiment, five) tire positioning means 5 provided on the outer circumference of the central position X-X of the second stage S2. Moreover, the five spots on the outer circumferential surface of the tire are grasped, and then positioned and fixed.

Figure 26:
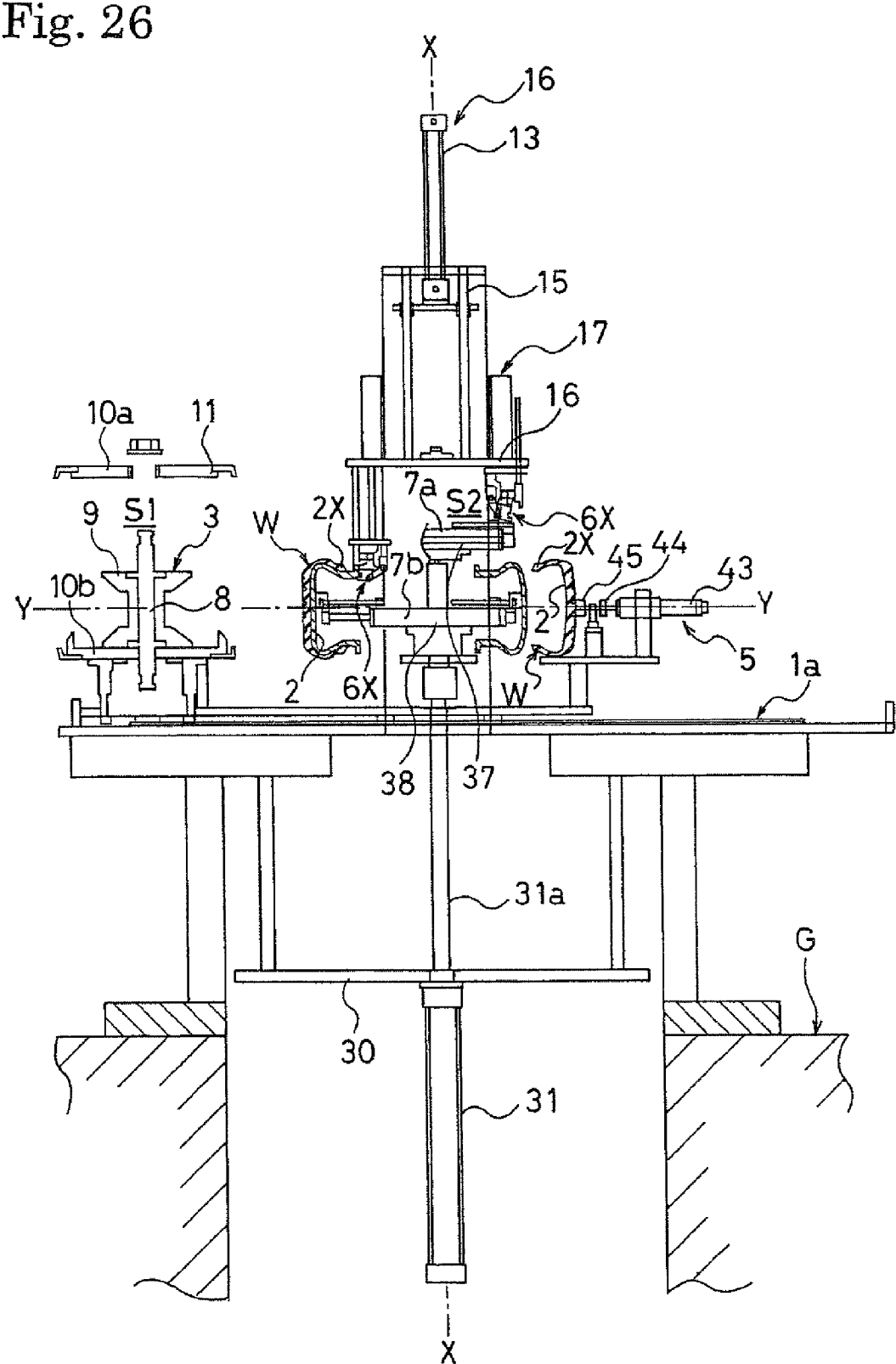
FIG. 26 is an explanatory drawing for a third step according to the second embodiment.
Figure 27:
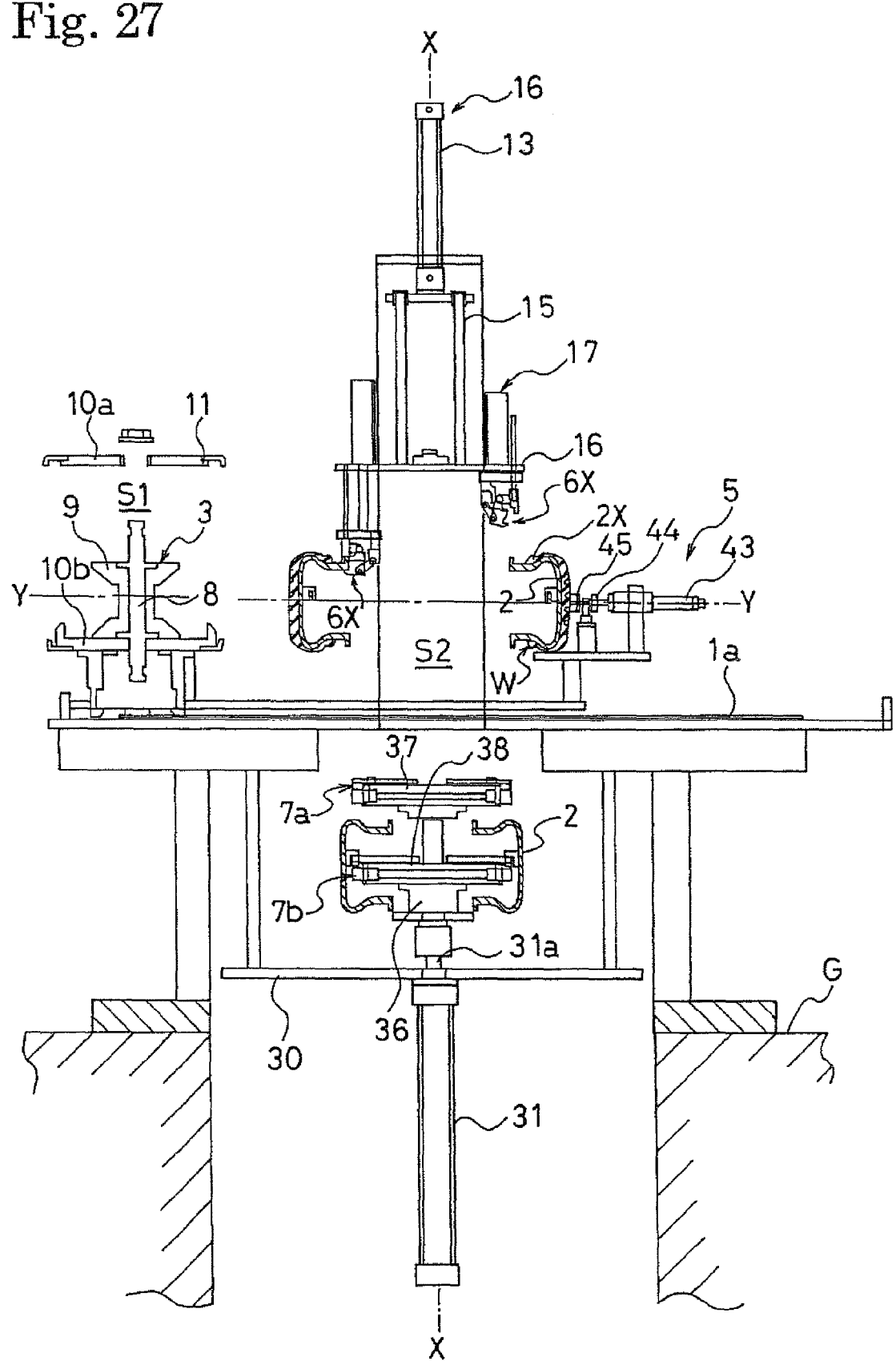
FIG. 27 is an explanatory drawing for a fourth step according to the second embodiment.

After that, as shown in FIG. 26, among the pair of the upper and lower core separation/removal mechanisms 7a, 7b having been on standby below the center of the tire, the second core separation/removal mechanism 7b positioned on the lower side is raised, by extending the vertical cylinder 31 serving as elevating means, to a portion slightly lower than the center Y-Y of the height position of the rigid core body 2, the portion being inside the rigid core body 2. Then, by extending the attachment-detachment cylinders 39 radially disposed on the second hold plate 38, the T-shaped engagement members 41 provided to the tip ends of the attachment-detachment cylinders are positioned to lower sides of the concave-shaped engagement portions 40 provided to the center of the inner wall surfaces of the segment group 2B (the five mount-shaped segments 2b) of the rigid core body 2. In such a state, when the second hold plate 38 is raised by the vertical cylinder 31, the T-shaped engagement members 41 engage with the concave-shaped engagement portions 40.

In this state, when the attachment-detachment cylinders 39 are caused to contract, the segment group 2B (the five mount-shaped segments 2b) are simultaneously pulled to the central position X-X side of the second stage S2, and then transferred to a position which is within the inner diameter portion of the tire W, and which does not interfere therewith. Then, this segment group 2B (the five mount-shaped segments 2b) is lowered onto the plate 30 by contracting the vertical cylinder 31, while being held by the second core separation/removal mechanism 7b on the second hold plate 38 (see FIG. 27).

Subsequently, as in the case of the second core separation/removal mechanism 7b, the first core separation/removal mechanism 7a is raised, by extending the vertical cylinder 31, to the portion slightly lower than the center Y-Y of the height position of the rigid core body 2, the portion being inside the rigid core body 2. Then, by extending the attachment-detachment cylinders 39 radially disposed on the first hold plate 37, the T-shaped engagement members 41 provided to the tip ends of the attachment-detachment cylinders 39 are positioned to lower sides of the concave-shaped engagement portions 40 provided to the center of the inner wall surfaces of the segment group 2A (the five sector-shaped segments 2a) of the rigid core body 2. In such a state, when the first second hold plate 37 is raised by the vertical cylinder 31, the T-shaped engagement members 41 engage with the concave-shaped engagement portions 40.

Figure 28:
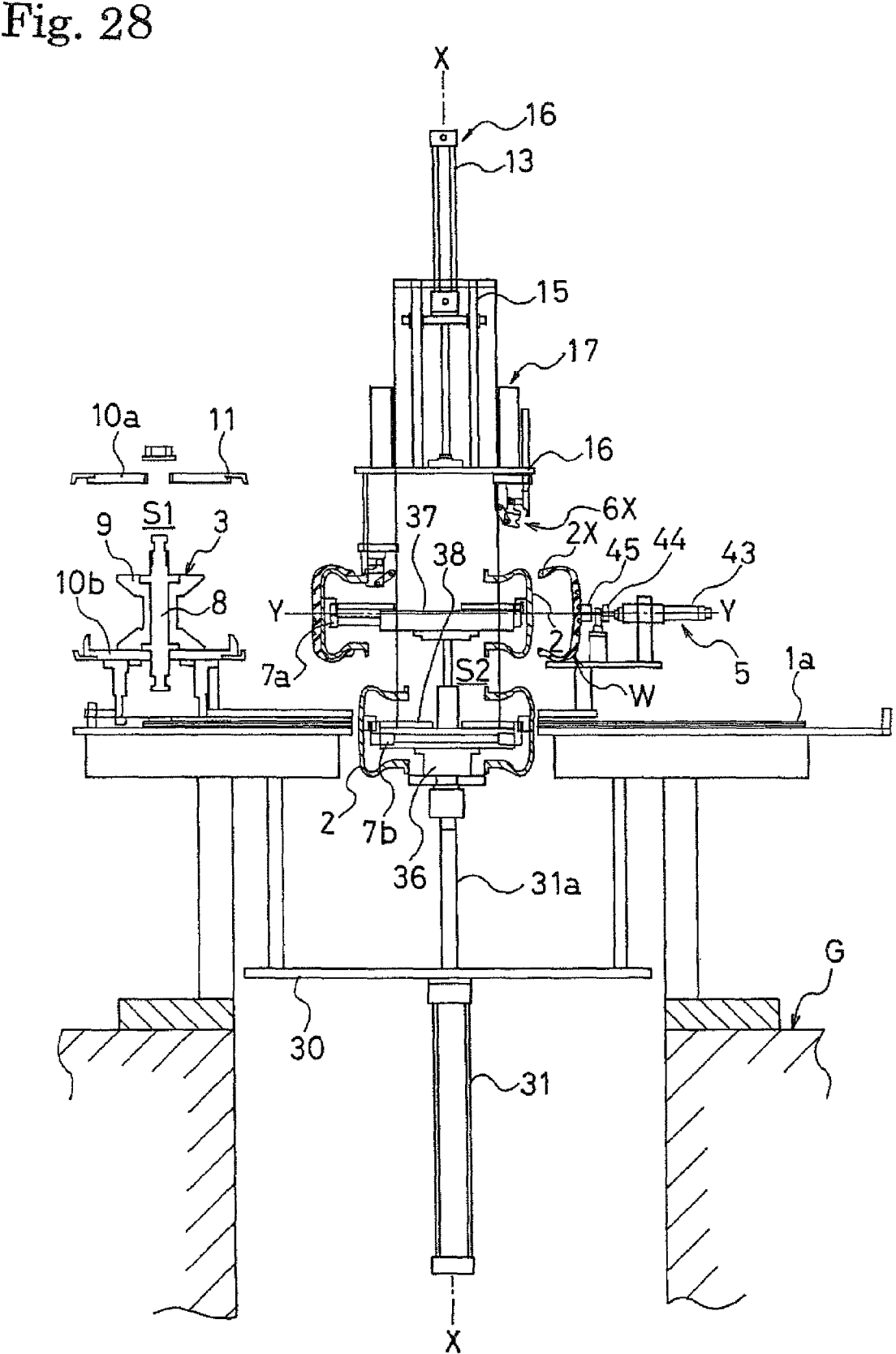
FIG. 28 is an explanatory drawing for a fifth step according to the second embodiment.
Figure 29:
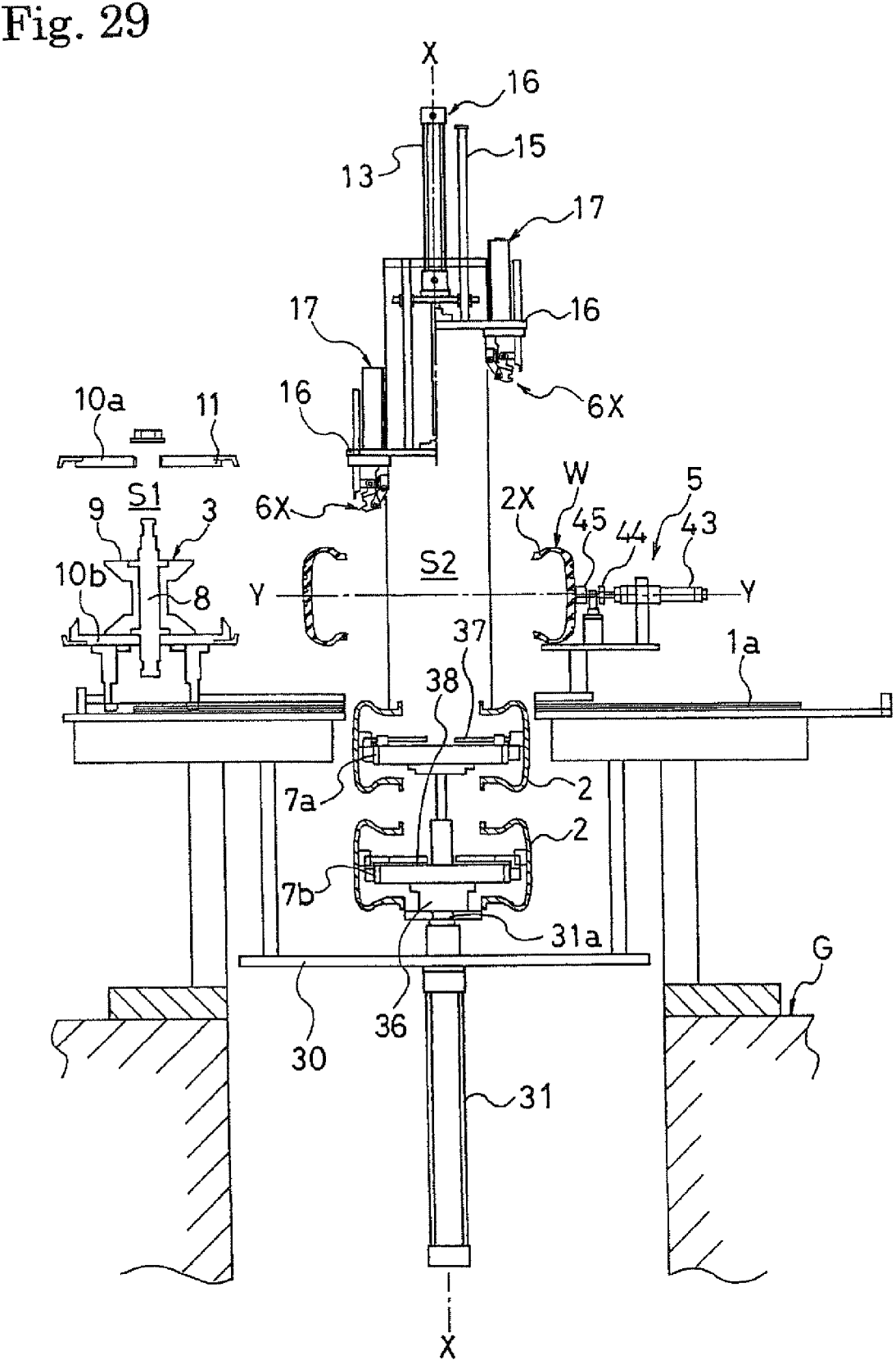
FIG. 29 is an explanatory drawing for a sixth step according to the second embodiment.

In this state, when the attachment-detachment cylinders 39 are caused to contract, the segment group 2A (the five sector-shaped segments 2a) are simultaneously pulled to the central position X-X side of the second stage S2, and then transferred to the position which is within the inner diameter portion of the tire W, and which does not interfere therewith (see FIG. 28). After the segment groups 2A and 2B of the rigid core body 2 are completely separated and removed from the inner surface of the tire W, the segment group 2A (the five sector-shaped segment 2a) of the rigid core body 2 is lowered below the support table 1 by contracting the vertical cylinder 31 as shown in FIG. 29. Subsequently, the rigid core body 2 is pulled out from the tire W. The tire W is conveyed to the subsequent process by the unillustrated conveying device.

Meanwhile, by reversely performing the above-described process of separating and dividing the segment groups 2A and 2B, it is possible to assemble the divided rigid core body 2 into a cylindrical form. Note that, in the above embodiments, by increasing the number of the core separation/removal mechanisms, the present invention can be used for a rigid core body composed of three or more types of segment groups.

As has been described, according to the present invention, it is possible to separate and automatically remove each type of segments constituting the rigid core body 2 from the tire W that has been vulcanized or that has not been vulcanized, and then to convey the segments. Particularly, since the rigid core body 2 can be separated automatically without man-power, the operating efficiency can be significantly improved. Moreover, by reversing the separation process, the separated rigid core body can be assembled. Furthermore, the entire device can be manufactured relatively easily and cost-effectively, and also the configuration can be made compact.

What is claimed is:

1. A method for separating and removing a rigid core for building a tire, in which method at least two types of segment groups constituting a rigid core body divided in plurality in a circumferential direction of the tire are separated and removed sequentially for each segment type from the inside of the tire either after the tire has been vulcanized or before the tire has been vulcanized at the time of building the tire, the method characterized by comprising:

when the rigid core body is to be separated and removed from the inside of the tire, removing a core holding mechanism and upper and lower support plates from the rigid core body disposed in the tire;

subsequently transferring the tire to a predetermined position on a support table to be positioned and fixed;

thereafter using an elevating means to raise a second core separation/removal mechanism, the second core separation/removal mechanism being positioned on the lower side among a pair of core separation/removal mechanisms that have been on standby below the center of the tire on the support table, to a height where the second core separation/removal mechanism is located within the tire, wherein when the second core separation/removal mechanism is positioned at the height within the tire, a first core separation/removal mechanism of the pair is located above the second core separation/removal mechanism;

engaging and holding a center of an inner wall surface of a first type of the segment groups among the at least two types of segment groups with the second core separation/removal mechanism;

horizontally pulling the first type of the segment groups toward a center of the tire until the first type of the segment groups is separated from the inner surface of the tire;

lowering the first type of the segment groups thus separated to a first standby position below the center of the tire so as to leave the first type of the segment groups on standby;

engaging and holding a center of an inner wall surface of a second type of the segment groups among the at least two types of segment groups with the first core separation/removal mechanism, after the first core separation/removal mechanism has been positioned at the height within the tire;

horizontally pulling the second type of the segment groups toward the center of the tire until the second type of the segment groups is separated from the inner surface of the tire;

afterwards, using the first core separation/removal mechanism to transfer the second type of the segment groups to a second standby position; and conveying the tire from which the rigid core body has been separated, to a subsequent process by a conveying device.

2. The method for separating and removing a rigid core for building a tire according to claim 1, wherein, when the first and second core separation/removal mechanisms sequentially hold the center of the inner wall surfaces of the first and second types of the segment groups, a plurality of attachment-detachment cylinders of the core separation/removal mechanisms are caused to extend in a radial direction, engagement portions provided to tip end portions of rods of the attachment-detachment cylinders engage with engagement portions formed at the center of the inner wall surfaces of the first and second types of the segment groups, and the first and second types of the segment groups are sequentially and horizontally pulled toward the center of the tire by contracting the attachment-detachment cylinders.

* * * * *